United States Patent [19]

Eways

[11] Patent Number: 5,561,575

[45] Date of Patent: Oct. 1, 1996

[54] FOOT-CONTROLLED OPERATIONAL MECHANISM FOR SPECIALIZED CASSETTE PLAYERS

[76] Inventor: Michael I. Eways, P.O. Box 791, Greenbelt, Md. 20768

[21] Appl. No.: 561,267

[22] Filed: Nov. 21, 1995

Related U.S. Application Data

[63] Continuation-in-part of Ser. No. 407,299, Mar. 20, 1995, abandoned.

[51] Int. Cl.$^6$ ................................................. G11B 19/02
[52] U.S. Cl. ................................................. 360/137
[58] Field of Search .......................................... 360/137

[56] References Cited

U.S. PATENT DOCUMENTS

| | | | |
|---|---|---|---|
| 3,995,314 | 11/1976 | Jacobson | 360/137 |
| 4,032,983 | 6/1977 | Sato | 360/69 |
| 4,628,390 | 12/1986 | Motoyama et al. | 360/137 |
| 5,278,719 | 1/1994 | Green et al. | 360/137 |

*Primary Examiner*—Robert S. Tupper

[57] ABSTRACT

A foot-controlled mechanical device to greatly enhance the convenience and efficacy of specialized cassette players; specifically, a compatible accessory which allows hands-free operations of cassette players designed as song learning devices for instrumentalists. The carriage (22) contains the cassette player, holding it secure and shielding it against damage during operations. Pivoting foot-pedal (34) and mobile pivoting foot-pedal (40) are supported above the cassette player in an operative mode. The resistance/stop mechanisms (26L) and (26R) support the foot-pedals (34) and (40), provide adjustable resistance for customized tension, provide immediate reset after each use, and serve as stop mechanisms to avoid damage to the cassette player. Pivot-shaft (32) is secured in the bushings (30) to provide a strong support and pivot-axis for foot-pedals (34) and (40). A center support (38) reinforces pivot-shaft (32) and provides a lateral guide for foot-pedal (34). Foot-pedal (34) is free to pivot up and down in-place to operate the rewind/review function of the cassette player. Mobile foot-pedal (40) also pivots on shaft (32) and has the additional capacity to be shifted forward and back and from side to side to provide access to three separate functions: play, fast forward, and stop. The anti-sway cartridge (42) provides lateral stability for mobile foot-pedal (40) during operations. The controls of the cassette player are contacted and engaged with the foot-pedal buttons (44) during operations. Designed with the principle of economy, "less is more", this highly effective operational mechanism serves as an instrumentalists foot-stand in addition to its intended primary functions.

20 Claims, 29 Drawing Sheets

| | |
|---|---|
| A. AC adapter | I. Play |
| B. Headphone output | J. Fast forward/Cue |
| C. Headphone output | K. Stop |
| D. Instrument input (1) | L. Tape speed |
| E. Instrument input (2) | M. Pitch control |
| F. Power indicator | N. Tape volume |
| G. Effect switch | O. Instrument volume (1) |
| H. Rewind/Review | P. Instrument volume (2) |

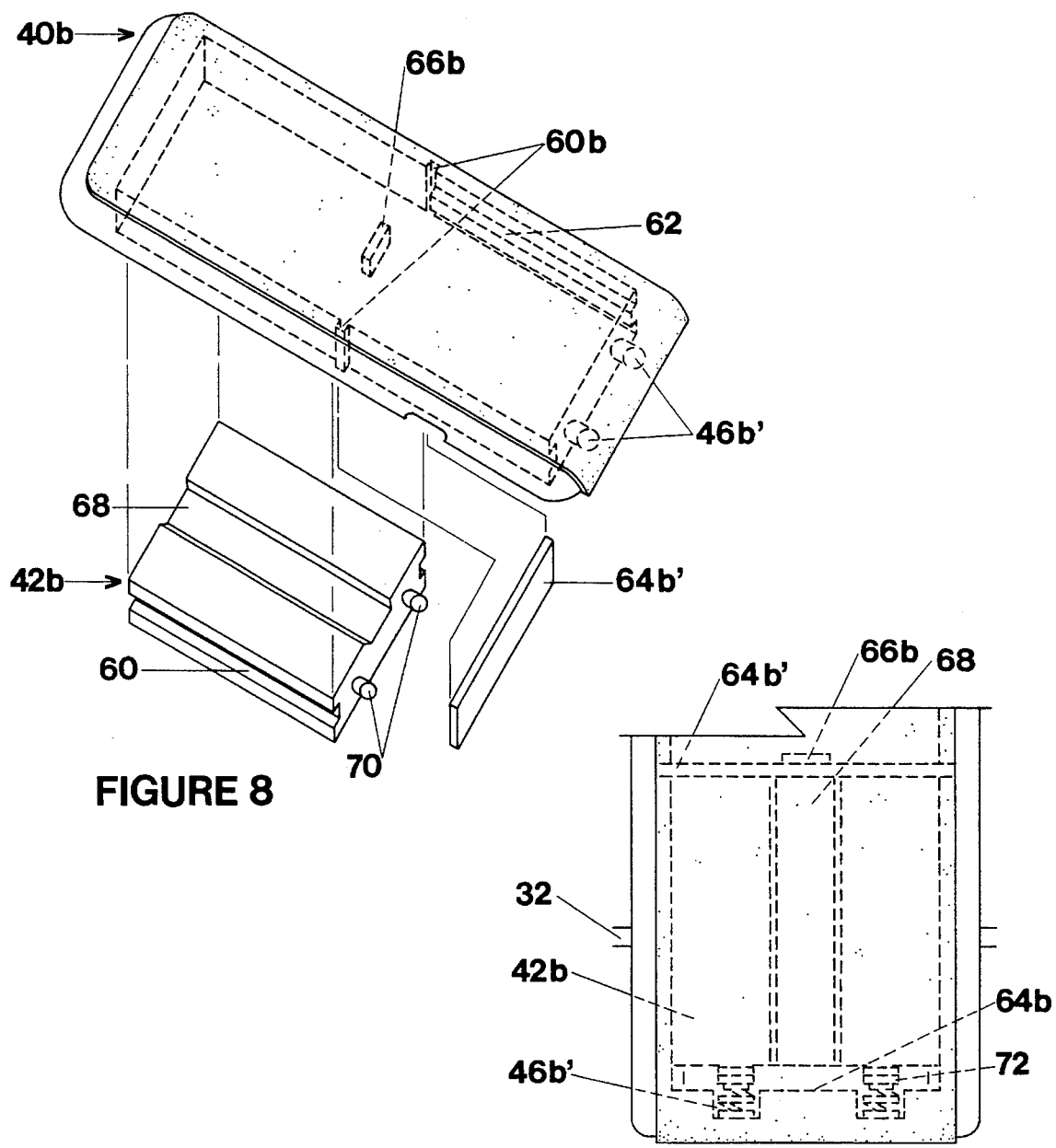

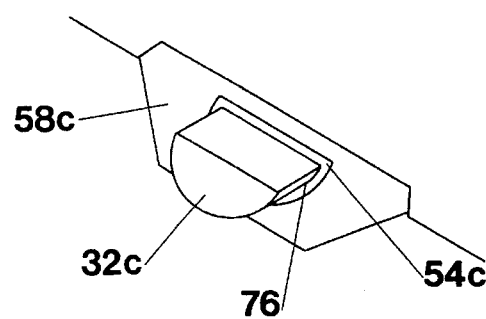
FIGURE 9
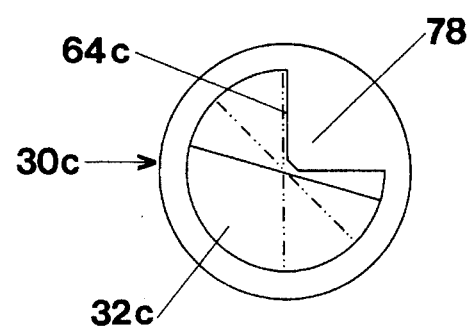
FIGURE 9A
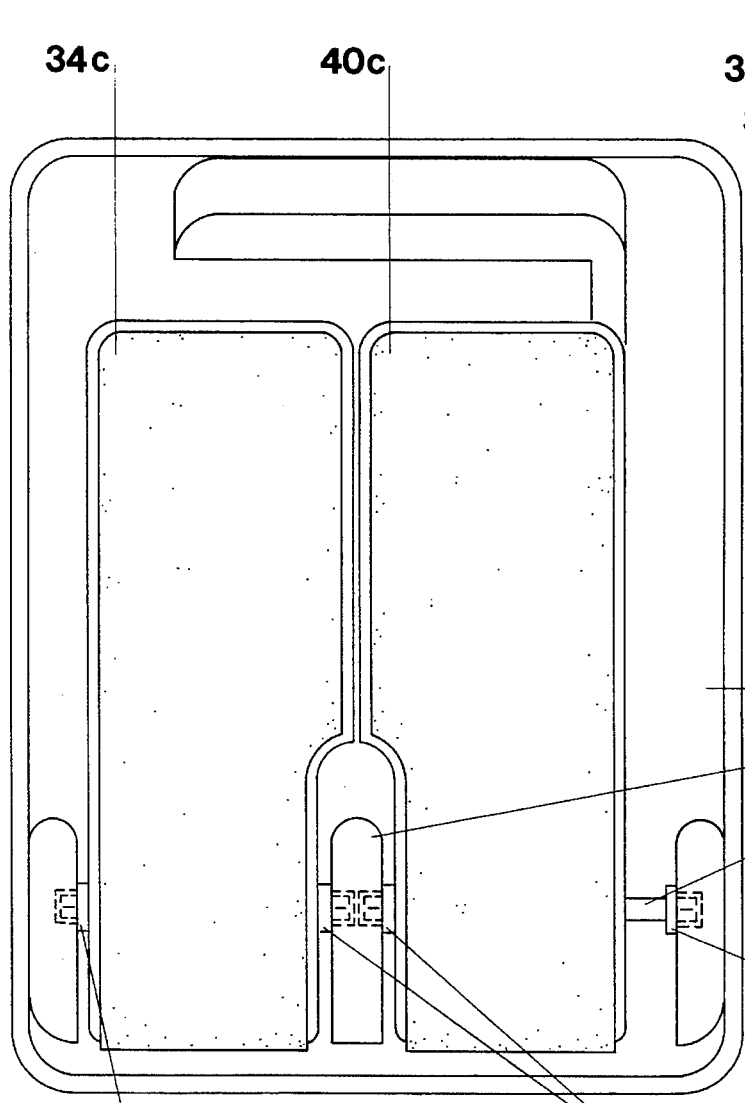
FIGURE 9B
FIGURE 9C

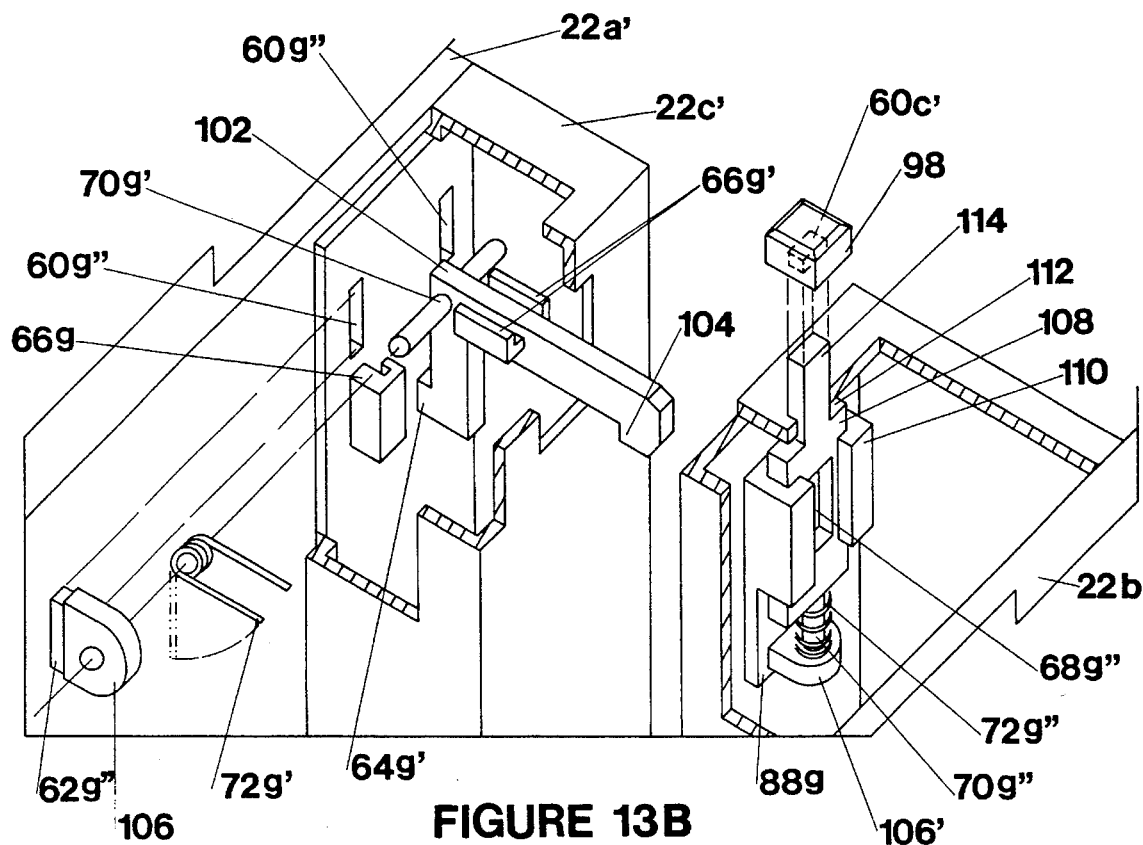
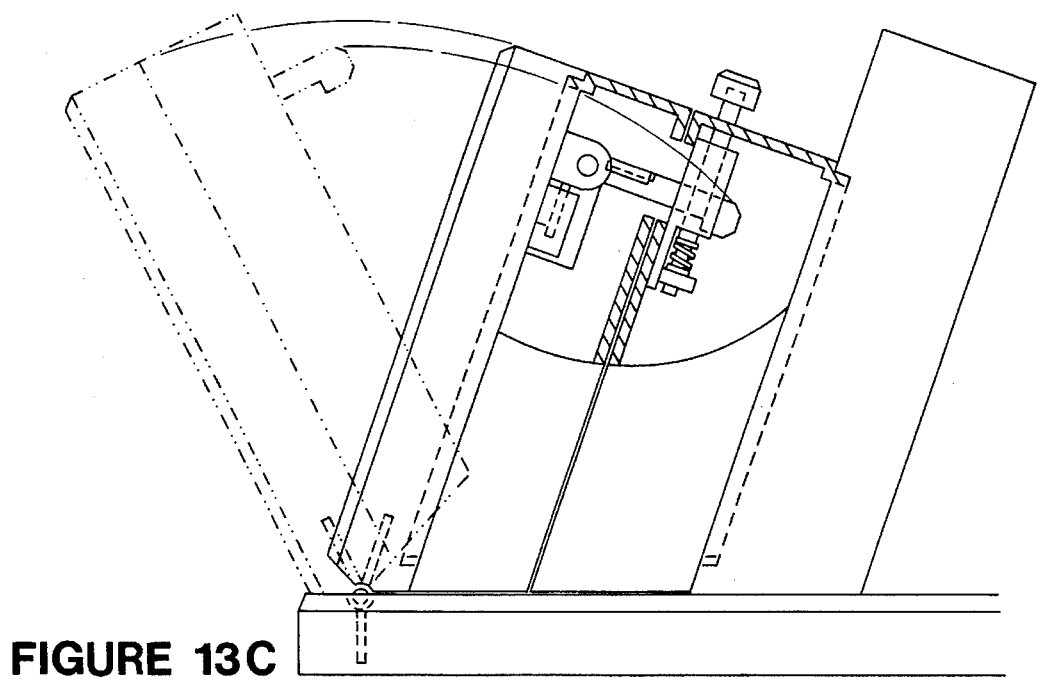

FIGURE 13 D"

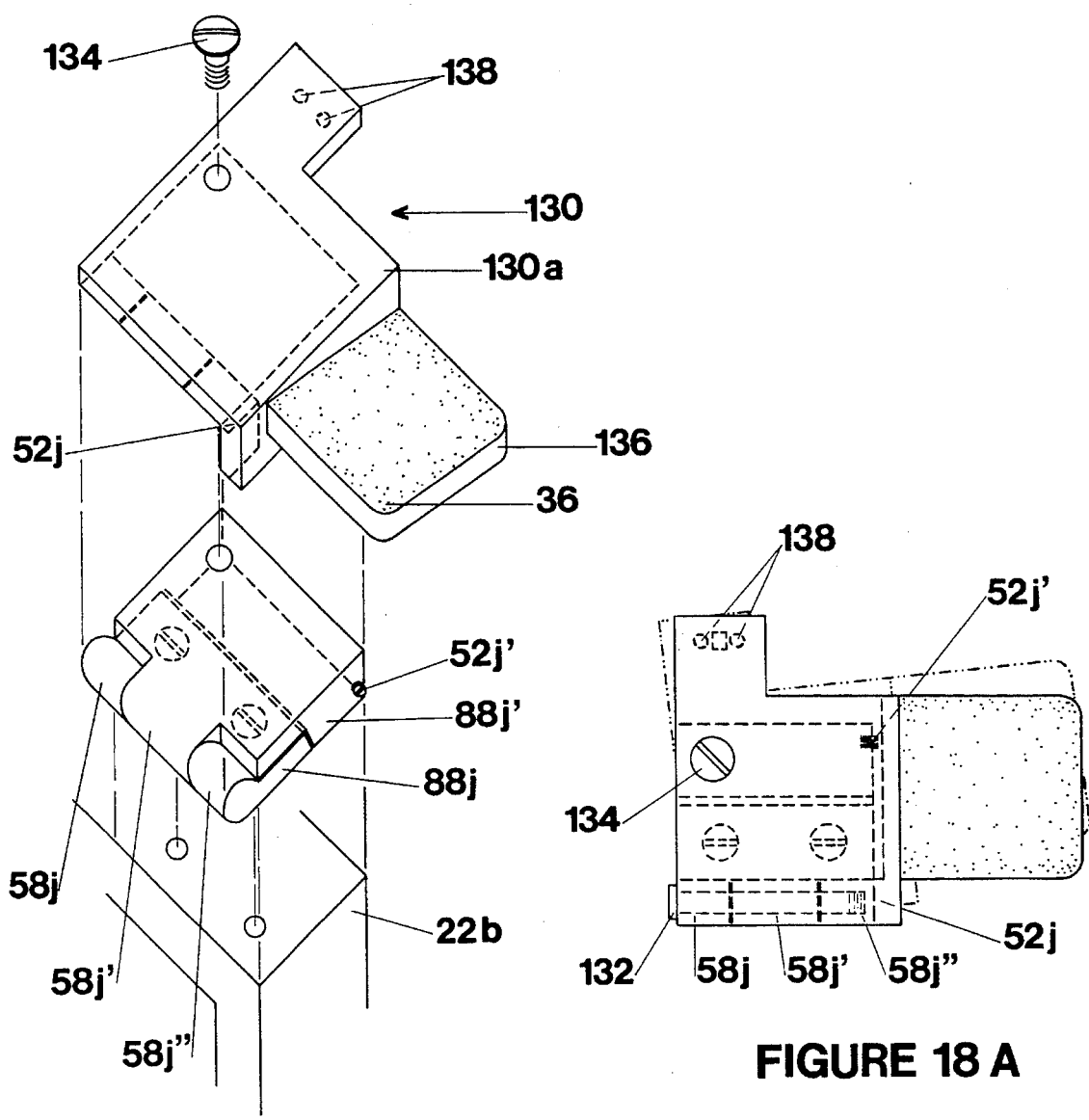
FIGURE 18
FIGURE 18 A
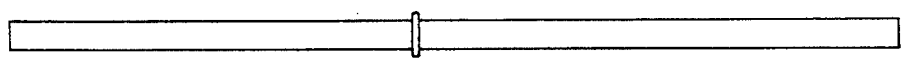
FIGURE 19

FOOT-CONTROLLED OPERATIONAL MECHANISM FOR SPECIALIZED CASSETTE PLAYERS

This application is a sequential continuation-in-part of application Ser. No. 08/407,299, filed Mar. 20, 1995, now abandoned.

BACKGROUND-FIELD OF INVENTION

This invention relates to foot-controlled mechanical devices, specifically to such devices which are compatible to operate functions of specialized electronic cassette players.

BACKGROUND-DESCRIPTION OF PRIOR ART

For as long as man has been creating art, other artists have been reinterpreting this art for the purpose of learning and influence, to develop technical skills as well as absorb other less tangible facets of artistic expression. This is also true in the art of making music, and is clearly evident in the successive evolution of technique and styles in the history of popular music.

For the last few decades, instrumentalists have used records to learn musical passages, melodies, and songs "by ear", physically picking up the phonograph needle and placing it back on the record to repeat phrases until the aspiring artist "found" the melody on his or her instrument. This time-honored technique has proven to be quite effective, though it has also proven to be as wearing on ones' patience as it is on the vinyl recordings. Furthermore, though this practice is still in use today, it is fading quickly along with the records and record-players themselves.

Recently, a few electronics manufacturers have "picked-up" on this once esoteric, now widely accepted learning device, and have recognized the growing demand for a replacement. As a result, it is now possible to purchase a cassette player with features specifically adapted for the purpose of learning songs "by ear", via repetition. In my search through dozens of current musicians periodicals, manufacturers catalogs, and mail-order retailers, I have found a total of four such manufacturers. Each of the four units produced by these companies has similar standard features designed to allow the operator to review recorded musical passages repeatedly for the purpose of learning. Unfortunately, three of the four models maintain the exact inherent disadvantage of the original approach (with records), in that the musician has to repeatedly remove his or her hand away from the instrument to review a musical passage. The fact that this major disadvantage was not resolved suggests that the design engineers of these tape players are probably not aspiring musicians and have spent very little time, if any, using the end product. In fact, two of these three units are actually modified, high-end, brand-name tape recorders with added features to allow the musician to review musical passages repeatedly; as a result, these two products are over-equipped, involved, and quite expensive.

The third of these three "hand-operated" tape players, the IBANEZ™ Rock and Play (RP-200 for guitar and RP-202 for bass guitar) is designed for the sole purpose of learning songs and as such is appropriately engineered and reasonably priced. This specialized cassette player, (manufactured by Hoshino Gakki Ten Inc. of Japan and distributed through its' subsidiary company Hoshino U.S.A Inc. in Bensalem, Pa.), offers several useful functions to aid the aspiring musician in learning songs and is quite effective. Furthermore, the IBANEZ Rock and Play cassette player is widely available and has been highly successful as a commercial product for over three full years. But again, the inherent drawback of this unit is that the artist has to keep shifting one hand or the other from the instrument to the tape player and back.

The remaining specialized cassette player; Rock Shops, foot-controlled cassette player, (manufactured and distributed by Rock Shop music in Media, Pa. -cited as prior art) addresses this issue but nonetheless has several remaining inherent disadvantages:

(a) The aforementioned unit is widely unavailable, if it is available at all; in my search through dozens of current musicians periodicals, manufacture's literature, mail-order retailers and regional instrument dealers I have found one ad, placed one time only, in one guitar-oriented magazine. In addition, any attempt to reach a product representative using the information provided in the single advertisement was fruitless; I used the local regional directory assistance as well as the national/regional business directory to find no current listing available. I then wrote to the company to request any information regarding this product and its' availability; this request has remained unanswered.

(b) The advertised price of the described "foot-controlled cassette-player" was nearly twice the cost of IBANEZ™ RP-200 or RP-202; this further limits its accessibility as it is cost-prohibitive and less practical for the practicing musician and aspiring artist.

(c) The design of this unit is needlessly involved, using non-essential parts with inherent complications which add undue costs in parts, labor, and assembly time.

(d) As a product of the "built-in" approach to this combination design, the manufacturer offers no possible options to the consumer to purchase the player or the controller separately as a means of saving money or space when traveling.

(e) The design of this unit allows the operator to control a minimum amount of functions available on the cassette player: play, rewind, and stop.

(f) The design of this product uses three separate foot-pedals, with the capacity to operate only one function per pedal. This design requires the operator to remove his or her foot from the foot pedal and move from one pedal to the next to operate different functions. In addition, these foot pedals are several inches apart which further detracts from the efficiency and convenience which this product is intended to provide.

(g) The actual foot-pedals are very narrow, and small in comparison to the average foot, and as a result, do not provide sufficient practical support during or between operations. This type of disregard or mere oversight for comfort, efficiency, and practical ergonomics can be a major contributor to physical conditions such as repetitive motion injuries and overuse syndromes which are so prevalent in society today (especially in the music industry).

(h) The overall design itself is imbalanced; with the cassette player placed at the very front edge of the unit, the end product is front-heavy and more likely to be unstable. In addition, as a product of the open design, there is very little surface contact between the bottom of the unit and the floor to keep the unit stationary during operation. Lastly, the cassette player which is placed on the floor during operation, is fully exposed with no shield or barrier for protection against damage.

OBJECTS AND ADVANTAGES

Accordingly, several objects and advantages of my compatible foot controller are:

(a) to provide and make readily available a highly effective compatible accessory and tool;

(b) to provide a complementary accessory which markedly enhances the convenience and efficacy of a widely accepted existing product;

(c) to provide a useful operational device which solves a long-existing need for practicing musicians, and address the rapidly growing trend and demand in the market;

(d) to provide a useful and practical accessory at an affordable cost;

(e) to provide the convenience of a specialized foot controller with an economical design with no extraneous parts, labor, and undue expense to the manufacturer and consumer;

(f) to provide a separate foot-controlled mechanical device as an "optional" accessory which can be purchased at a later date as finances permit and can be easily detached to save space while traveling;

(g) to provide a compatible foot controller which offers "hands-free" access to all four major functions of the specialized cassette player: play, rewind, fast-forward and stop;

(h) to provide a "user-friendly" foot-controller which permits access to more functions with less parts and less actual movement, more specifically, to use a single foot-pedal to control multiple functions.

(i) to provide a foot controller with a highly ergonomic design which reduces undue stress and strain and accommodates the operator by incorporating large (long and wide) foot-pedals mounted at a slight incline. These features promote comfort during operations and in addition, provide a reliable and sturdy "foot-stand" between operations as a secondary function.

(j) to provide a foot-controlled mechanism with practical balance and weight distribution to ensure stability during use.

(k) to provide a foot-controlled mechanical device that is streamlined and lightweight enough to be portable, yet with enough substance, weight, and surface contact, to remain stationary during use.

(l) to provide a compatible foot-controlled mechanism which "houses" the cassette player to serve as a shield and barrier to prevent potential damage.

Further objects and advantages of my invention will become apparent from a consideration of the ensuing description and drawings.

DRAWING FIGURES

In the drawings, closely related figures have the same figure numbers with added letter suffixes and primes. In these figures, repeated or closely related elements are delineated with an (L) for left and a (R) for right in the original embodiment of my foot controller. Modified varieties of the original elements are identified with the original reference numbers which are further delineated with letter suffixes and primes for clear reference.

FIGS. 9 through 9O show an alternative foot-pedal mounting system in perspective, elevations and plan view.

FIGS. 10 through 10D show another alternative foot-pedal mounting system in perspective, elevation and section.

FIGS. 14 and 14A show two variations of another alternative retaining system in perspective views.

Figure 16:
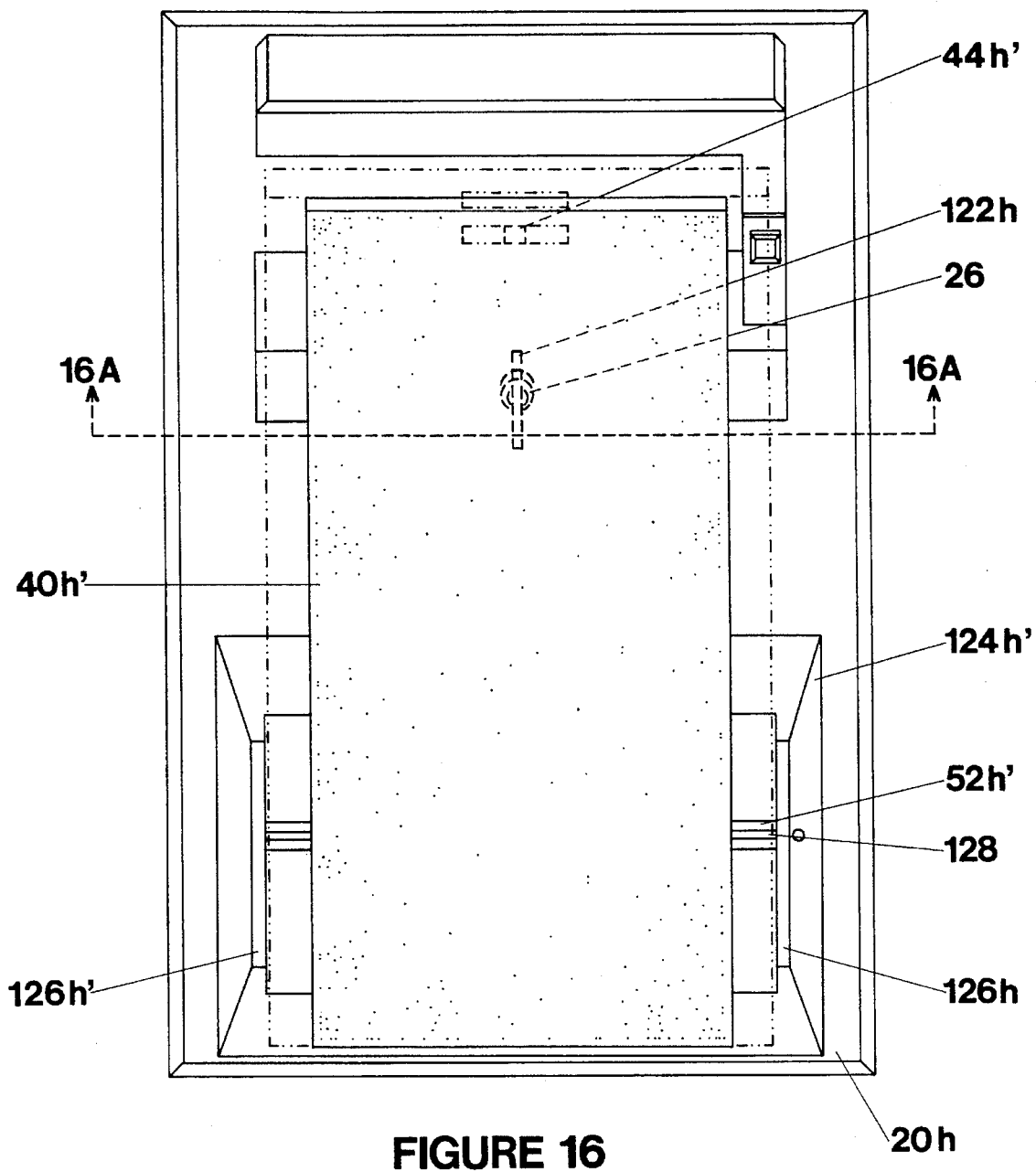
Figure 16:
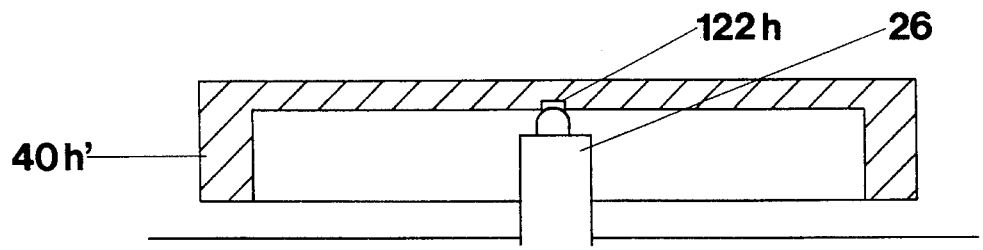

FIG. 16 through 16El show alternative embodiments of my foot controller where one mobile foot-pedal is used to provide access to the various functions of a specialized cassette player.

Figure 17:
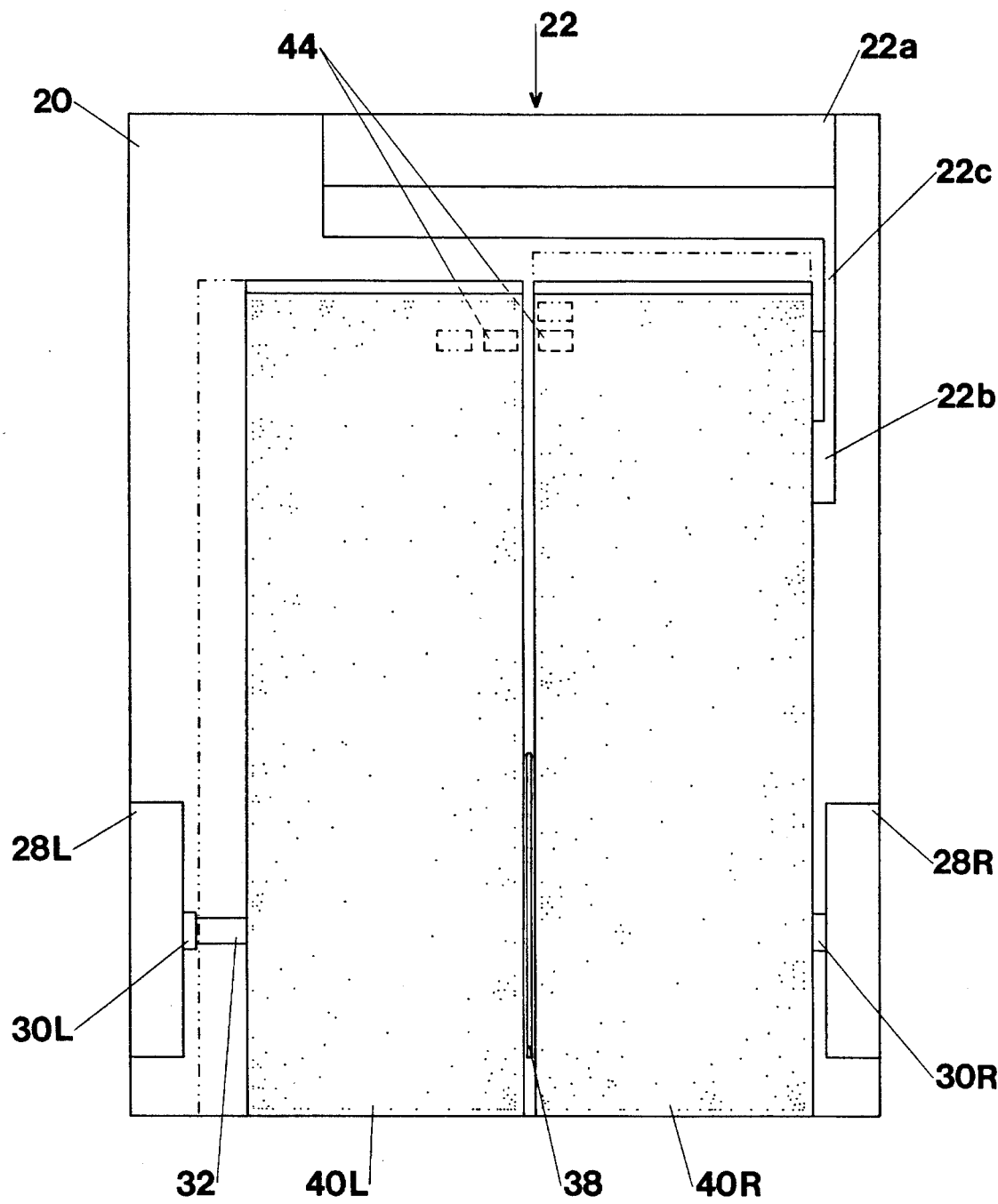
Figure 17A:
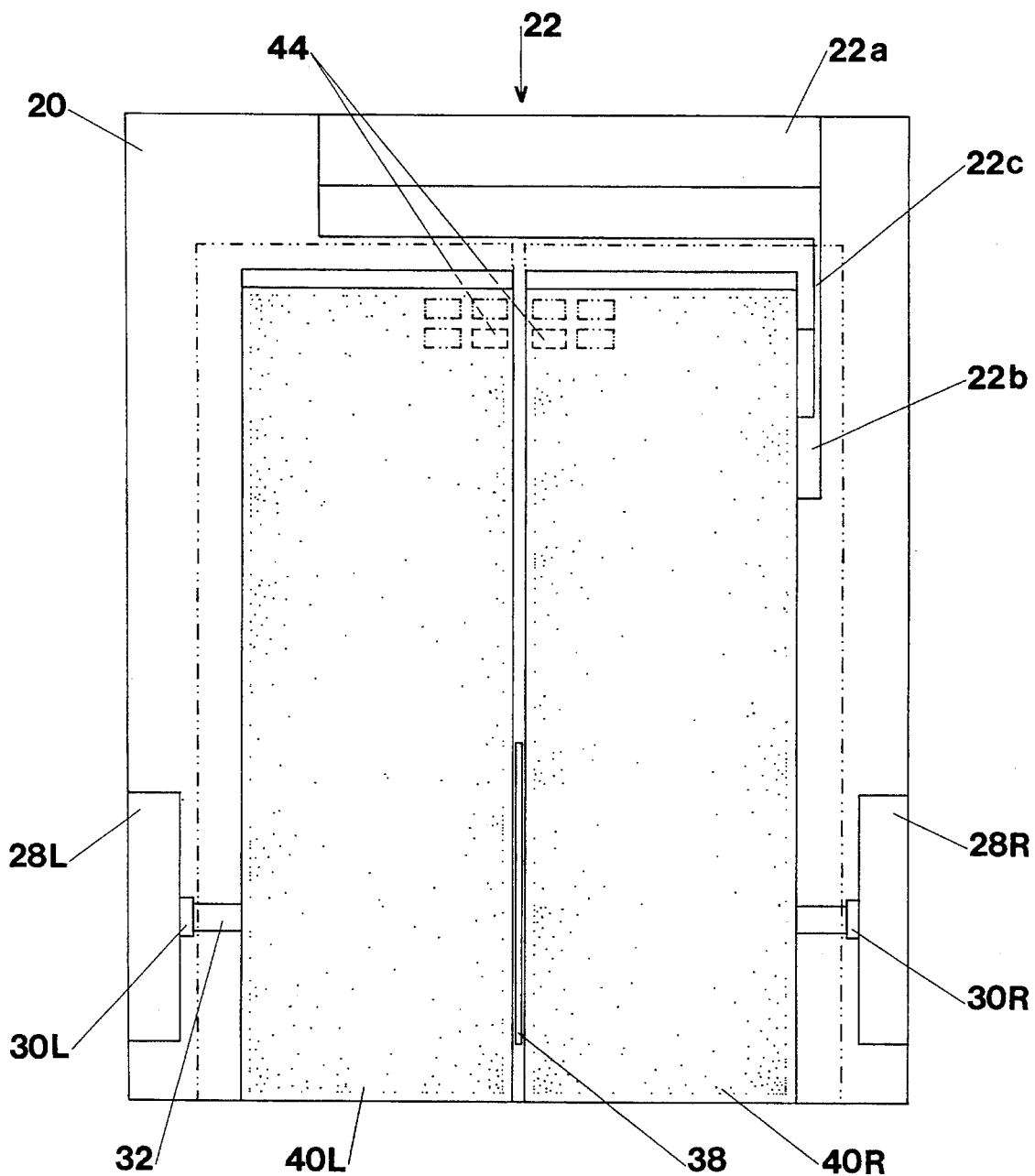

FIGS. 17 and 17A show various embodiments which employ two mobile foot-pedals to demonstrate the design flexibility of the mobile-pedal systems.

FIGS. 18 and 18A show an exploded perspective and plan view of a foot-controlled switch-selector for providing hands-free access to the tape speed function of the specialized cassette player.

FIG. 19 shows a conventional pivot-shaft with a raised ridge or rib for providing a built-in lateral guide.

Figure 20:
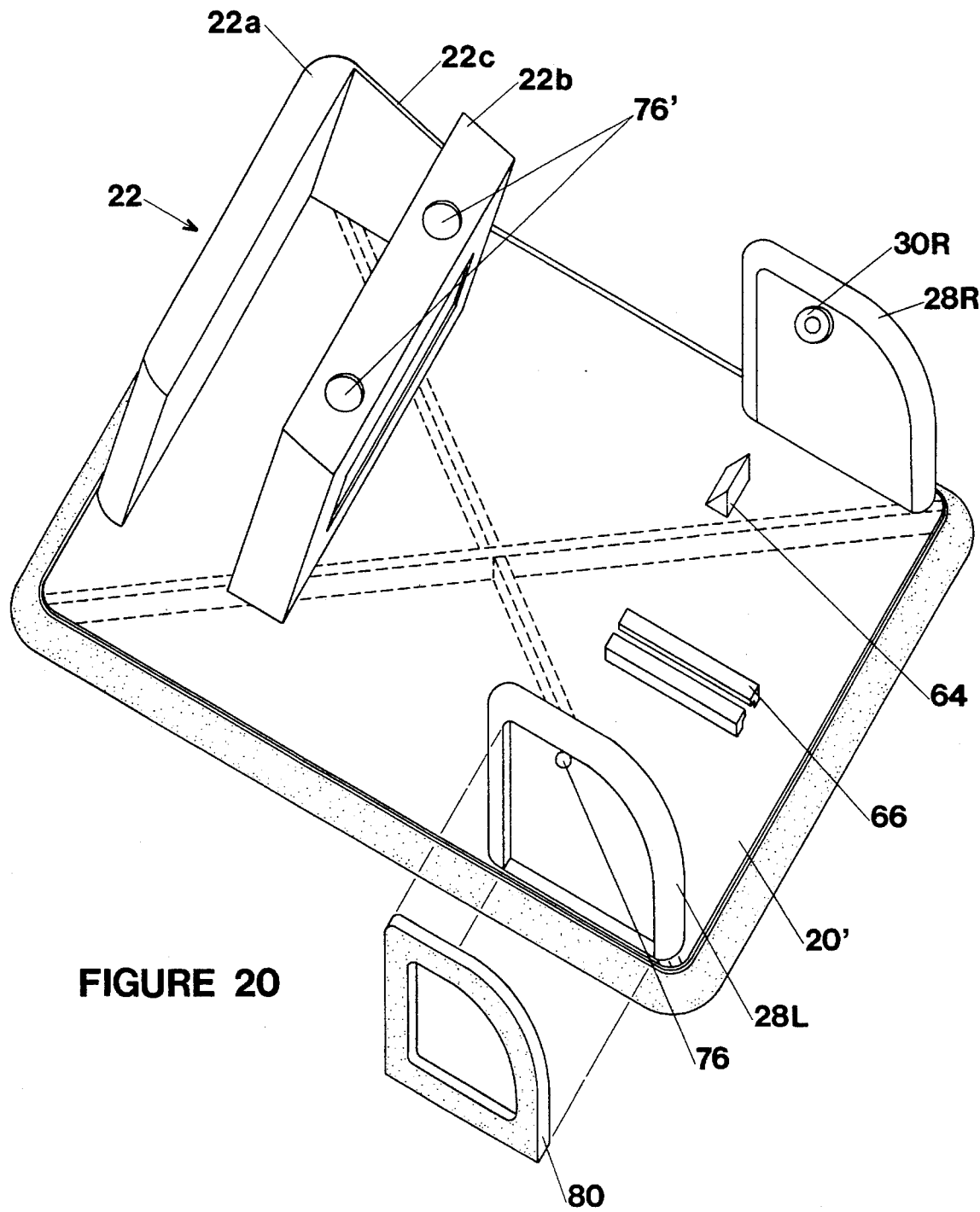

FIG. 20 shows one cost-effective design for a production model of my foot controller where the base, carriage, and pivot-shaft supports are molded integrally as one rigid, stationary part.

Figure 21:
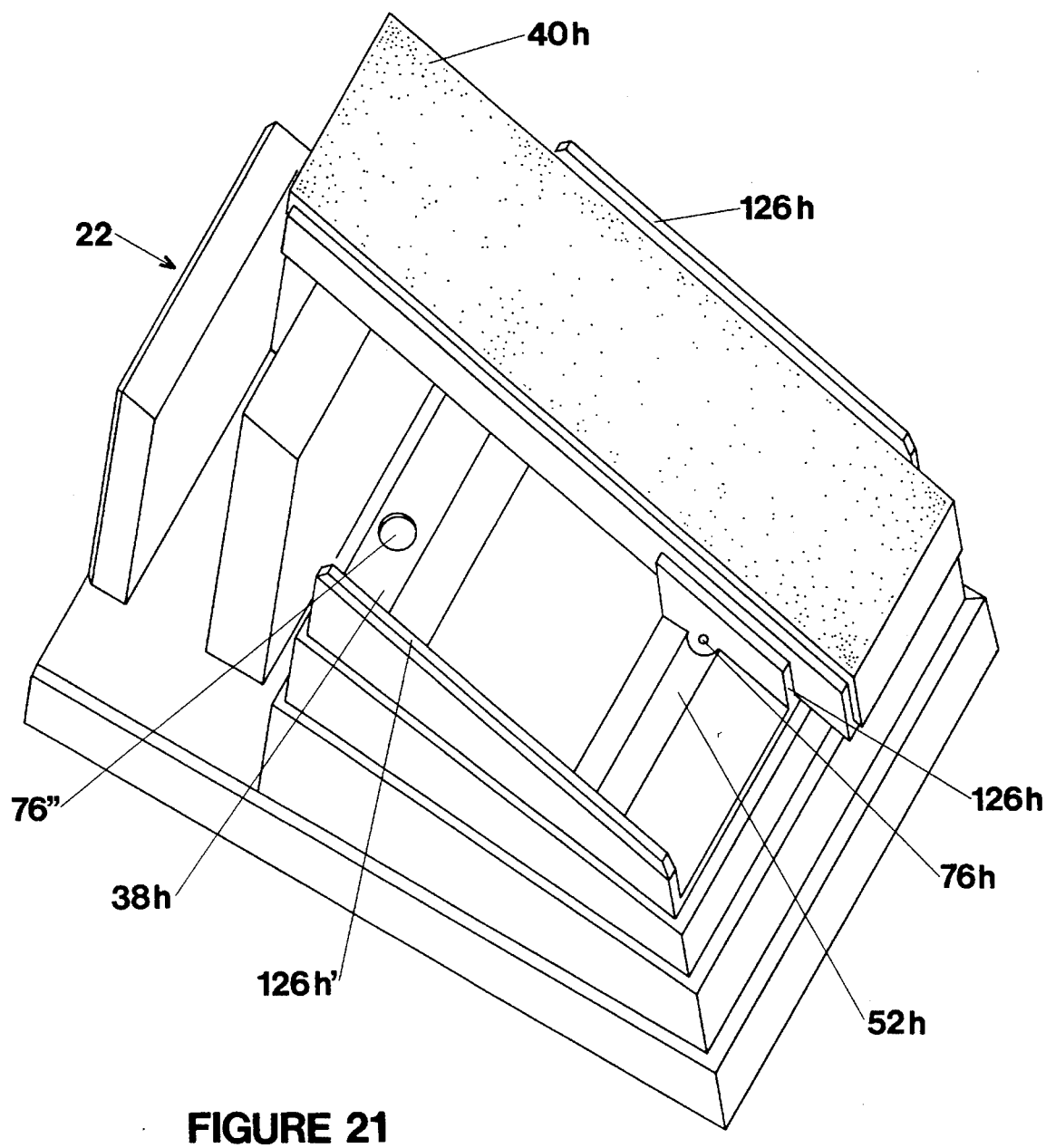
Figure 21A:
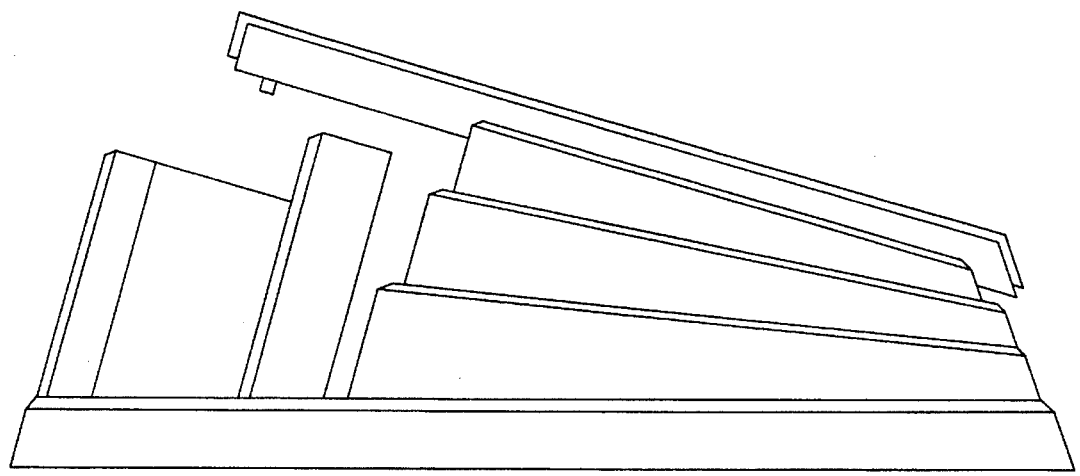
Figure 21B:
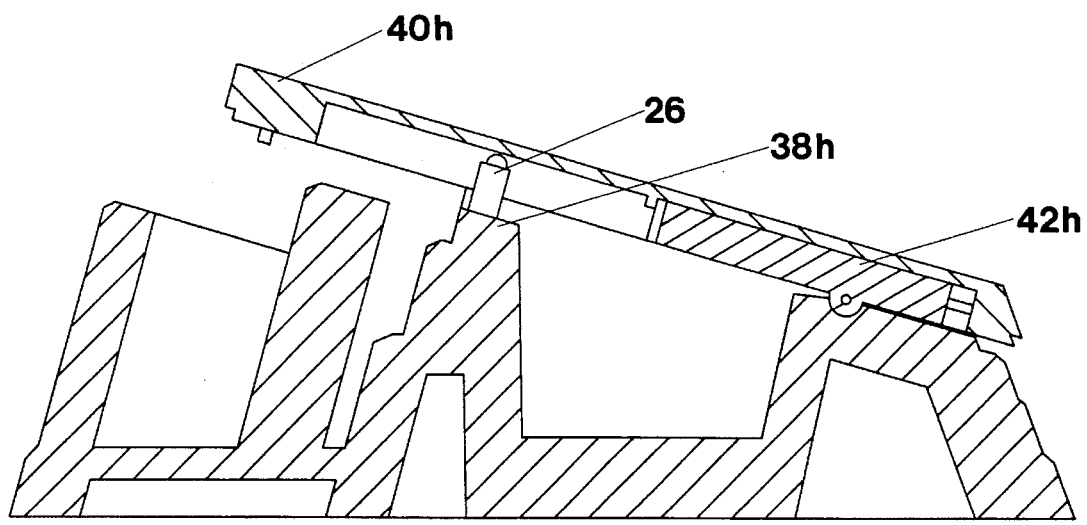

FIGS. 21, 21A, and 21B show another variety of an integrated chassis application in perspective, elevation, and section.

Figure 22:
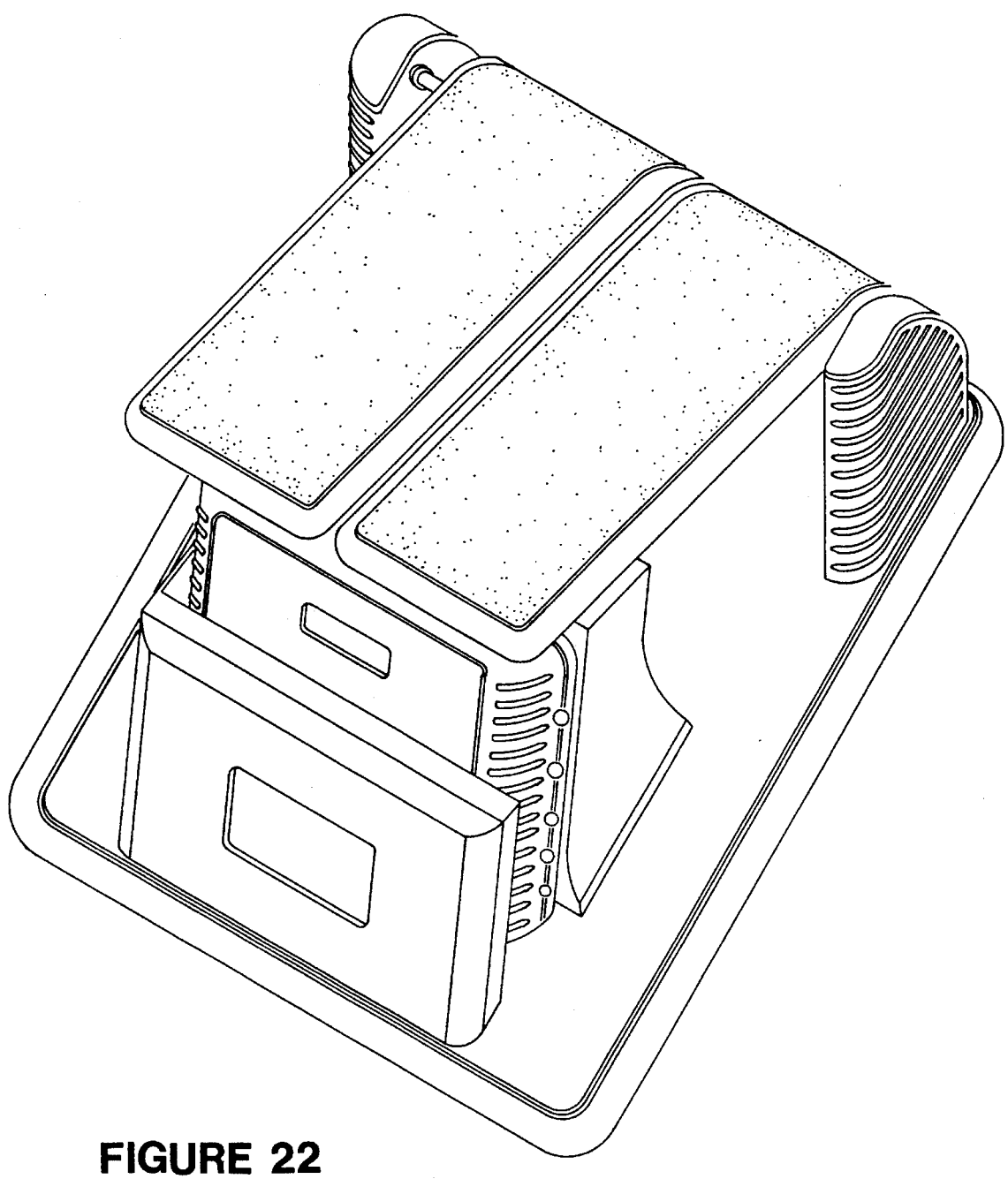
Figure 22:
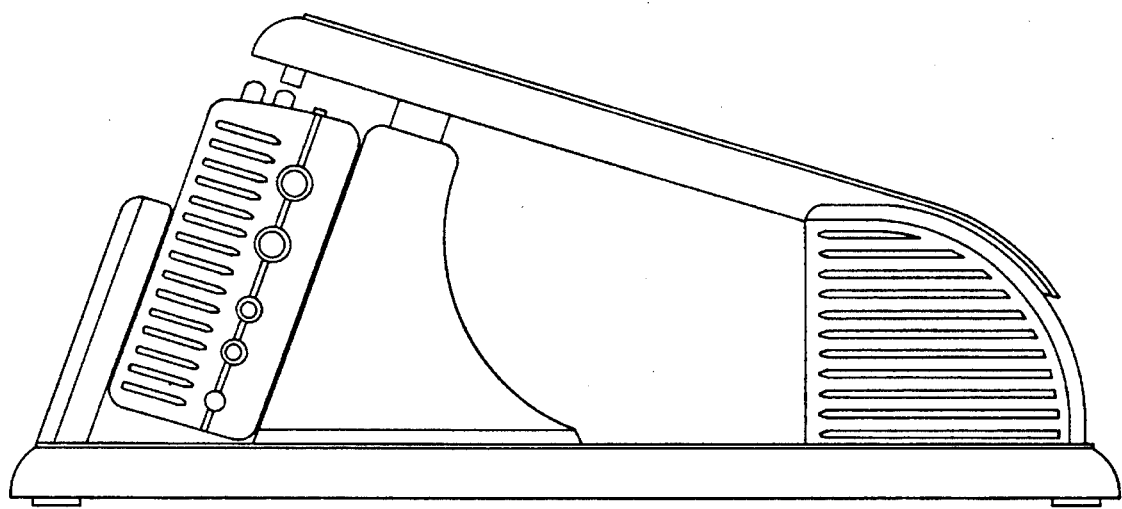

FIGS. 22 and 22A show a perspective view and side elevation of one possible interpretation of a production model of my compatible foot controller.

| Reference Numerals in Drawings | |
| --- | --- |
| 20 | Base |
| 22 | Carriage |
| 24 | Protective Lining |
| 26 | Adjustable Resistance/ Stop Mechanism |
| 28 | Shaft Support |
| 30 | Flanged Bushing |
| 32 | Pivot-Shaft |
| 34 | Pivoting Foot-Pedal |
| 36 | Slip-Resistant Surface |
| 38 | Central Support |
| 40 | Mobile Foot-Pedal |
| 42 | Anti-Sway Cartridge |
| 44 | Foot-Pedal Button |
| 46 | Circular Chamber |
| 48 | Oblong Channel |
| 50 | Runner |
| 52 | Track |
| 54 | Sheathe |
| 56 | Cusp |
| 58 | Mounting Block |
| 60 | Mortise |
| 62 | Tenon |
| 64 | Mechanical Stop |
| 66 | Mounting Clip |
| 68 | Passage |
| 70 | Post |
| 72 | Recoil Mechanism |
| 74 | Flange |
| 76 | Cavity |
| 78 | Wedge |
| 80 | Access Panel |
| 82 | Cam |
| 84 | Key |
| 86 | Frame |
| 88 | Mounting Plate |
| 90 | Mounting Nut |
| 92 | Retaining Ring |
| 94 | Piston |
| 96 | Breather |
| 98 | Trigger Button |
| 100 | Hinge |
| 102 | Lever Arm |
| 104 | Catch |
| 106 | O-Bracket |
| 108 | Gate |
| 110 | C-Bracket |
| 112 | Shoulder |
| 114 | Neck |
| 116 | Locking Strap |
| 118 | Grip Tab |
| 120 | Soft-Shell Retainer |
| 122 | Cut-Out |
| 124 | Trestle |
| 126 | Retaining Walls |
| 128 | Retaining Rod |
| 130 | Switch-Selector |
| 132 | Pivot-Rod |
| 134 | Shoulder Bolt |
| 136 | Foot-Pad |
| 138 | Prongs |

DESCRIPTION OF PRIMARY EMBODIMENT-(FIG. 1)

Figure 1:
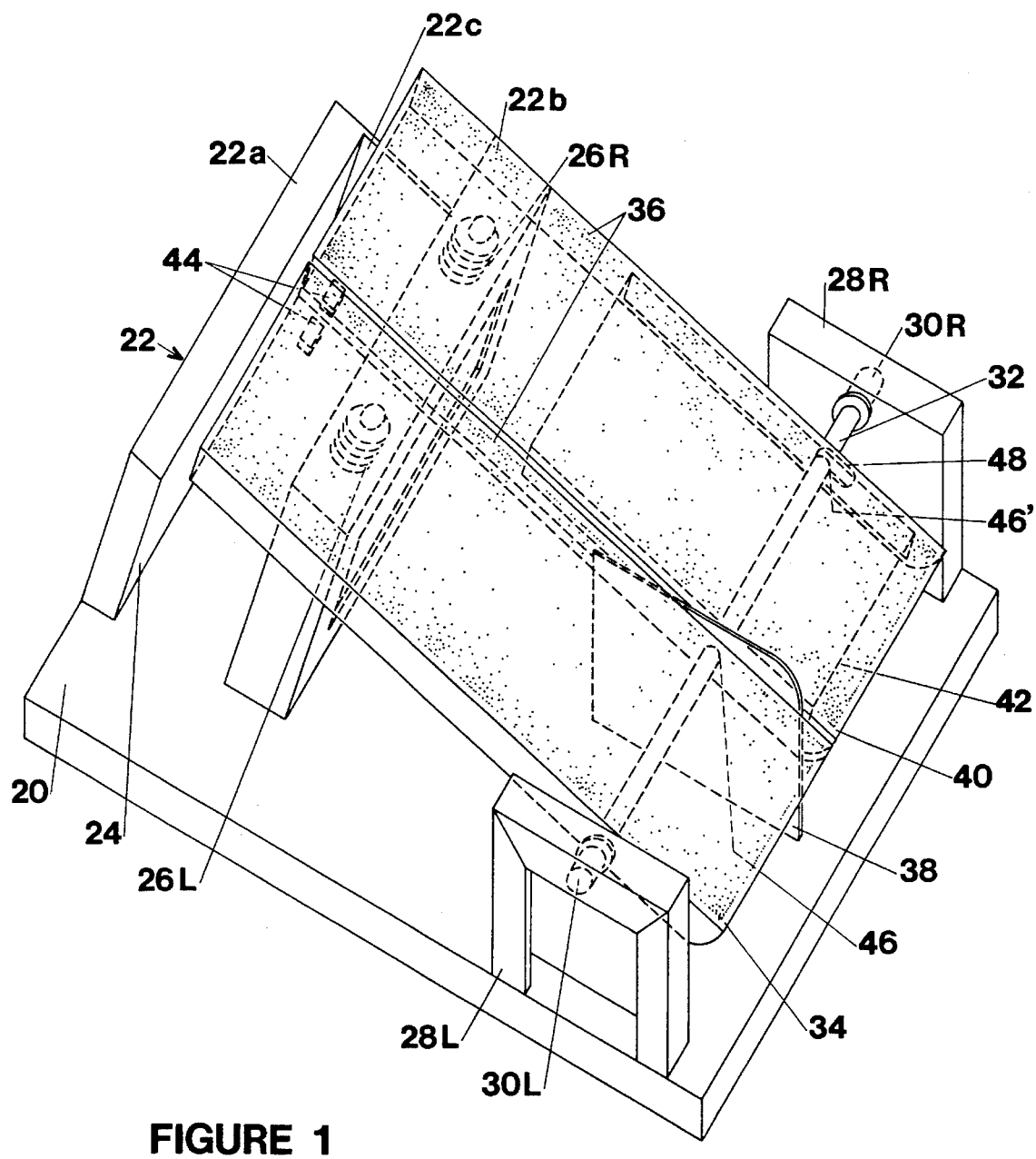
FIG. 1 is a perspective view the most basic embodiment of my compatible foot controller which illustrates and references its respective parts.

FIG. 1 shows a perspective view of the basic version of my compatible foot controlled operational mechanism or compatible foot controller for specialized cassette players. For the purpose of clarity, I will provide a description of all of the essential parts of my foot-controller using FIG. 1 exclusively; FIGS. 2 through 22 are provided to illustrate additional information regarding operations, reference details, and various alternative embodiments. In addition, because most of the parts of my invention are constructed of 1.5 mm. sheet steel (in its initial embodiment), I will avoid needless repetition and redundancy by specifying other materials only; in other words, if 1 do not specify the material when describing a specific part in its basic embodiment, it is to be constructed of 1.5 mm. sheet steel. This sheet metal can be purchased through Celtic Construction, located in College Park, Md. Finally, the distinction between the terms chamber and channel in this text are as follows: Two circular openings running parallel in an element, whether open or connected, are referred to as a chamber. Two oblong openings running parallel in an element, whether open or connected, are termed channels.

Description

A base 20 which measures 230 mm (W)×310 mm (L)×22 mm (D), provides a platform for the various parts of my invention. At the front edge of base 20 is a three-sided carriage, generally indicated at 22, which is open from the top and on one side (left). Carriage 22 is positioned flush at the front edge of base 20, 28 mm from its closest side (right) and is spot welded permanently in place. Carriage 22 is mounted to base 20 at a 110 degree angle leaning toward the opposite end (back) of base 20. The fore wall 22a of carriage 22 measures 155 mm (W)×70 mm (H)×15 mm (D). The back wall 22b of carriage 22 is larger and measures 155 mm (W)×80 mm (H)×35 mm (D). The distance between the front and back wall of carriage 22 is 46 mm. A retaining guide 22c is positioned on the right side of carriage 22. Retaining guide 22c is connected and welded to the front and back walls of carriage 22 and is of no critical height. A protective lining 24 is adhered to the inside of the front and back walls of carriage 22. Lining 24 is a felt material and can be held in place with a general purpose adhesive.

Two adjustable resistance mechanisms with adjustable stop mechanisms or resistance/stop mechanisms 26L and 26R are threaded and screwed into wall 22b of carriage 22. Resistance/ stop mechanisms 26L and 26R measure 15 mm (W)×47 mm (H) and are screwed into 13.5 mm holes in the top plane of wall 22b. Resistance/stop mechanism 26L is located and screwed in place 25 mm on center from its closest edge (left). Resistance/stop mechanism 26R is located and screwed in place 43 mm on center from its closest edge (right). The depth to which resistance/stop mechanisms 26L and 26R are screwed into wall 22b is established during the "set-up" for use and is discussed in the operations text to follow. Resistance/stop mechanisms 26L and 26R have recoil or spring-loaded plungers set at 5.5 mm maximum travel distance. Resistance/ stop mechanisms 26L and 26R are made of steel and can be purchased through Celtic Construction of College Park, Md.

Two pivot-shaft supports 28L and 28R are attached to the back section of base 20 as shown in FIG. 1. Each shaft-support 28L and 28R measures 80 mm (W)×67 mm (H)×18 mm (D). Shaft supports 28L and 28R are located and welded in place flush or even with the outside edges of base 20, inset 18 mm from the back edge of base 20. Shaft-support 28R can remain unwelded to base 20 until all inner parts (below) are in place. A flanged bushing 30L is inset or recessed into shaft-support 28L and is welded secure. Bushing 30R is inset in shaft-support 28R and is welded secure. These bushings 30L and 30R are made of stainless steel and have an inside diameter of 6 mm. The depths of the entire bushings 30L and 30R are not critical so long as they are shallow enough to sink fully into the shaft-supports 281L and 28R. The "flange" portions of bushings 30L and 30R are then exposed and measure 2 mm (D). Each bushing 30L and 30R are located in the center (horizontal) of shaft-support 28L and 28FI respectively −58 mm on center above the top of base 20. Bushings 30L and 30R can be purchased through Celtic Construction of College Park, Md.

The support structure also includes a shaft or pivot-shaft 32 inset into bushing 30L on the left side and welded secure in place. Shaft 32 is made of stainless steel and measures 225 mm in length and is 6 mm in diameter. Shaft 32 can be purchased at most hardware stores or at Celtic Construction in College Park, Md.

A pivoting foot-pedal 34 is anchored to shaft 32; Foot-pedal 34 has two parallel 6.5 mm (Dia) circular holes to provide an elongated chamber 46 to accommodate shaft 32. These holes are located 58 mm on center from the closest (bottom) or proximal edge of foot-pedal 34. Foot-pedal 34 measures 87 mm (W)×260 mm (L)×15 mm (D). The top of foot-pedal 34 is covered with a slip-resistant surface 36. In this initial embodiment surface 36 is a "sticky-back" grip-tape and can be purchased at Caravan Supplies located in Beltsville, Md. A center support/stabilizer 38 is juxtaposed to foot-pedal 34. Support 38 is provided with an appropriate hole to accommodate shaft 32. Support 38 measures 100 mm (W)×67 mm (H) and is welded secure to base 20.

A mobile pivoting foot-pedal 40 is anchored to shaft 32. Mobile-pedal 40 measures 87 mm (W)×260 mm (L)×15 mm (D) and has two parallel oblong holes to provide an elongated oblong channel 48 to accommodate shaft 32. These oblong holes measure 15 mm (w)×6.5 mm (H) and are located 55 mm on center from the closest end of mobile pedal 40. The top of mobile-pedal 40 is also covered with surface 36. A lateral stabilizer mechanism or anti-sway cartridge 42 is recessed and housed inside the mobile pedal 40. Cartridge 42 measures 82 mm (W)×150 mm (L) ×9 mm (D) (outside dimensions) and has two parallel round holes to provide an elongated circular chamber 46' to accommodate shaft 32. These holes are 6.5 mm (dia) and are located 38 mm on center from the bottom of cartridge 42. Again, once all of the earlier described parts are in place, shaft 32 is inserted into bushing 30R and shaft-support 28R is welded secure.

Two foot-pedal projections or buttons 44 are attached to the distal underside of foot-pedal 34 and mobile-pedal 40. Buttons 44 are made of rubber and measure 10 mm (L)×5 mm (W)×7 mm (H). The exact placement of buttons 44 is determined and executed with the specialized cassette player placed in carriage 22. This step is executed in the final stage of construction to ensure proper alignment of buttons 44. Buttons 44 (typically used under lamps as scratch-resistant feet) can be purchased at most hardware stores or lamp stores.

The dimensions provided in the above description are derived from the first working prototype and are offered as a guide or reference for manufacturing; to insure proper functioning of this device, some fine tuning and minor adjustments may be necessary.

Although the description above contains many specificities, these should not be construed as limiting the scope of the invention, but as merely providing a clear and complete description of the most basic embodiment of my compatible foot controller. This description, with its specific dimensions and placement of featured parts, describes one primary embodiment of my compatible foot controller designed to provide operations of the IBANEZ™ RP-200 or RP-202 cassette players. These basic components can however be modified to effect equivalent results with the IBANEZ models and to adapt to other specialized cassette players designed and engineered for the same end purpose. These potential variations, ramifications, and additional embodiments are discussed in detail in the alternative designs and summary segments of this text.

Objects and Advantages

From the description above, a number of advantages of my foot-controlled operational mechanism become further evident:

a) The implementation of my compatible foot controller will greatly increase the effectiveness of an existing learning device.

b) This tool can be made accessible and readily available to aspiring instrumentalists at large.

c) This compatible foot controller will serve as an invaluable tool which can significantly increase the practicality and convenience of a widely accepted existing product.

d) The introduction of this useful operational device to the consumer will resolve a long-existing need in the craft; this advancement will address the rapidly growing trend and increased demand in the market.

e) The implementation of the production model of my foot controller (as discussed below) will provide an affordable accessory to the practicing musician.

f) This compatible foot controller will reduce possible undue costs to the consumer by utilizing an efficient and economical design with no extraneous parts and labor.

g) The implementation of my compatible foot controller as a separate device will provide an optional accessory; this accessory can be purchased at a later date (as finances permit) and can be detached to save space while traveling.

h) The "user-friendly" design of this compatible foot controller will provide hands-free control of all four major functions of the specialized cassette player; furthermore, this success will be achieved with only two foot-pedals.

i) The use of large (long and wide) foot-pedals, resting at a moderate incline, will provide an ergonomic design which reduces strain and promotes comfort during operations.

j) These various design considerations can provide an additional result; the foot-pedals can be used as strong and practical instrumentalists "foot-stands" during and between operations. This secondary function will further reduce the risk of strain and injury to the operator by providing an appropriate resting place during and between operations.

k) The design of my compatible foot controller will provide a practically balanced mechanism with proper weight distribution to promote stability during operations.

l) The carriage design, which is engineered to hold the cassette player firmly in place with friction, eliminates the need for any additional parts: retainer clips, fastening devices, etc.

m) Lastly, the three-sided carriage also serves as an effective shield or barrier to prevent potential damage to the cassette player.

Operations, Functions of Primary
Embodiment—(FIGS. 1 Through 6A)

In order to provide a complete and clear description of the operations of my compatible foot controller, I will first describe the function or functions of each part briefly. This measure is necessary to allow the reader to "walk-through" the step-by-step operations in their successive order without interruption.

Figure 4:
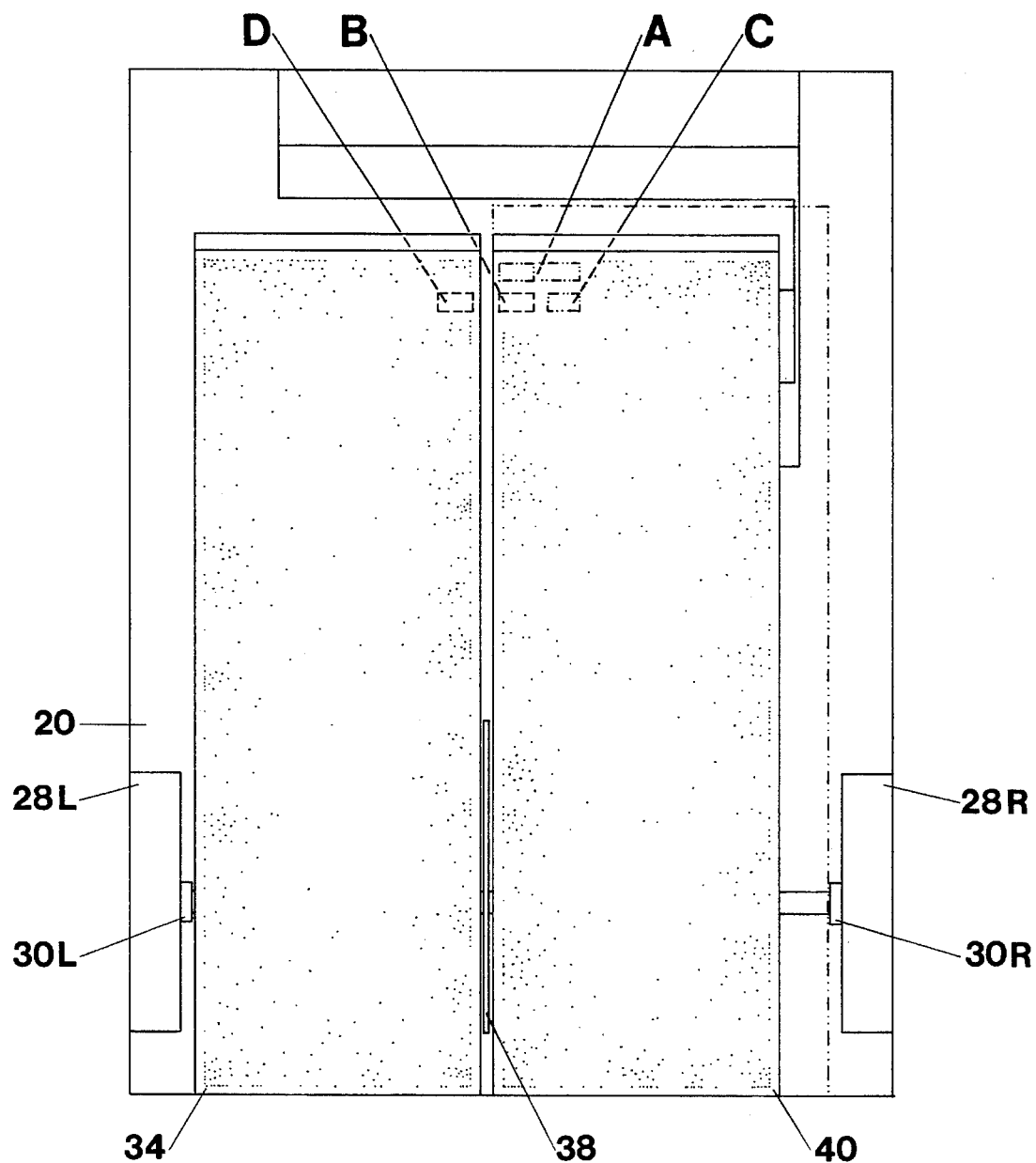
FIG. 4 is a plan view of my foot controller which illustrates the operative mobility of the mobile pivoting foot-pedal.
Figure 5:
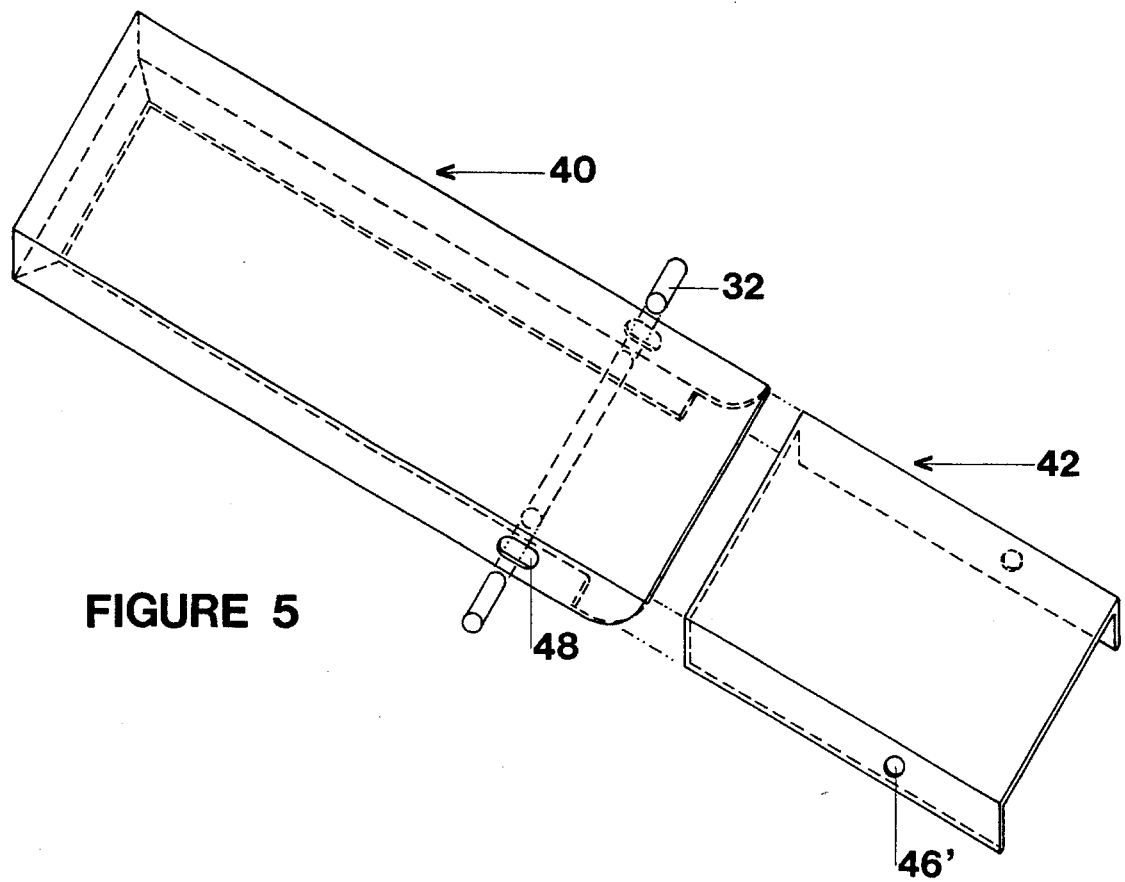
FIG. 5 shows a exploded perspective of one design and assembly of the mobile pivoting foot-pedal and anti-sway cartridge.

Base 20 provides a mounting surface for the various components of my compatible foot controller, (FIG.1). Carriage 22, at the front section of base 20, holds the cassette player (Prior Art, FIG.2) stationary during operations. Retaining guide 22c serves as a lateral catch to insert the cassette player into the correct operative position. Lining 24 serves to protect the cassette player from scratches when placing and removing the cassette player into carriage 22. (FIG.1). Shaft supports 28L and 28R are stationary anchors which house and retain bushings 30L and 30R respectively, (FIG.1). Bushings 30L and 30R are reinforced collars to accommodate shaft 32. The exposed ends of bushings 30L and 30R provide a gap between shaft-supports 28L and 28R and foot-pedals 34 and 40 respectively, (FIG. 4). This reduces surface contact between shaft-supports 28L and 28R and foot-pedals 34 and 40, and greatly reduces friction during operations.

Foot-pedal 34 is anchored to shaft 32 (FIG.1) and is free to pivot up and down; shaft 32 serves as a sturdy support and pivot-axis during operations. Mobile-pedal 40 is also anchored to shaft 32, free to pivot up and down with shaft 32 as a pivot-axis. Mobile-pedal 40 has the additional capacity to be shifted forward and back and from side to side to provide the control of three separate functions. FIG. 4 shows the three operative positions of mobile-pedal 40: A, B, and C. Shifted forward, in the "A" position, mobile-pedal 40 is aligned to engage the play function of the cassette player. Shifted back, parallel with foot-pedal 34, in the "B" position, mobile-pedal 40 provides access to the fast forward function of the cassette player. Shifted to the right side, in the "C" position, mobile-pedal 40 is in-line to engage the stop function of the cassette player. Surface 36, covering the tops of foot-pedals 34 and 40, provides additional friction for the operator to perform these functions with ease. Cartridge 42 (FIG. 5 - exploded view), provides lateral stability for mobile-pedal 40 to maintain the foot-pedal in longitudinal alignment with base 20 during these operations. Support 38 serves as a lateral guide for foot-pedal 34 while providing additional structural support for shaft 32 (FIG. 1).

Figure 3:
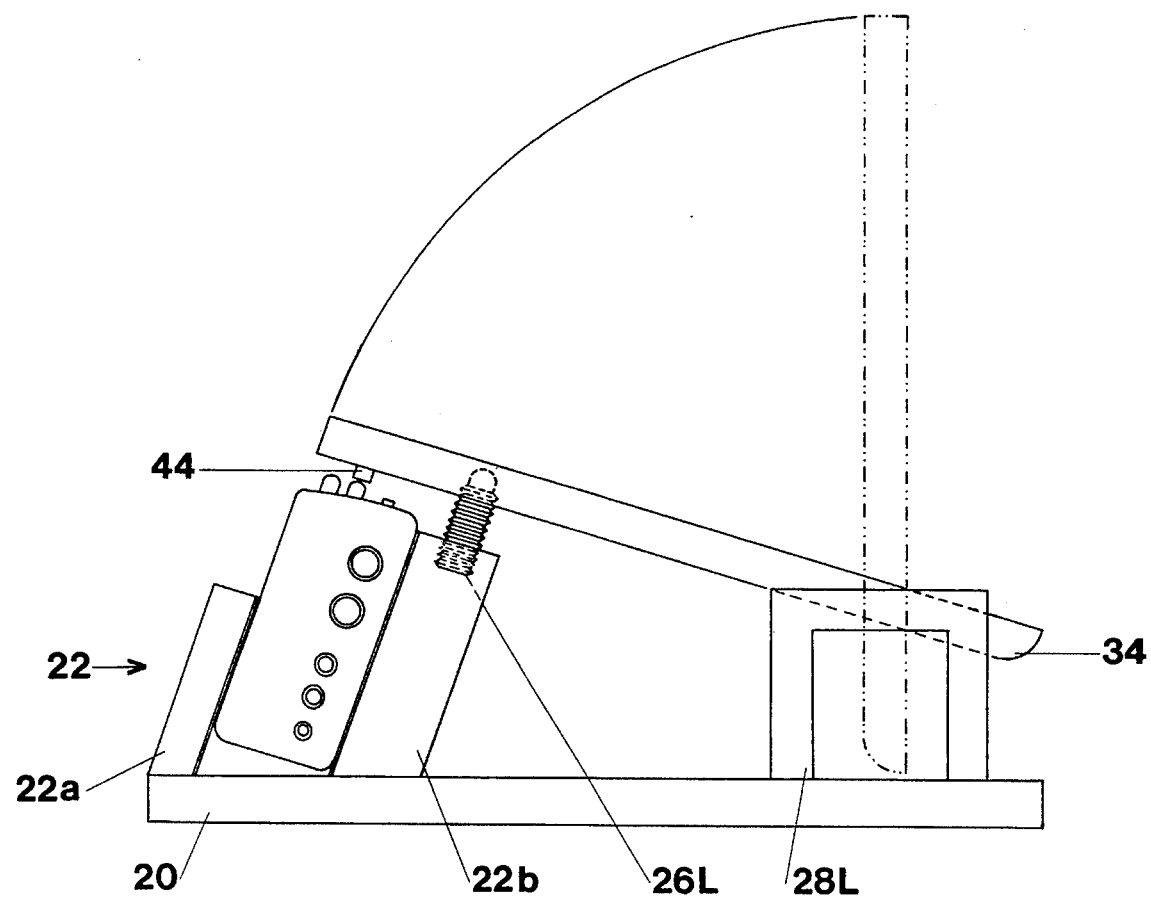
FIG. 3 is a side elevation of my foot controller which illustrates the "resting" slope and pivotal mobility of each foot pedal.
Figure 6:
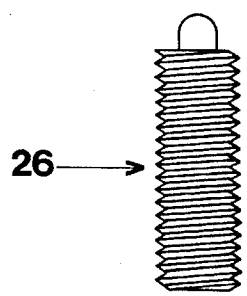
FIGS. 6 and 6A show an elevation and section of the adjustable resistance/stop mechanism.
Figure 6A:
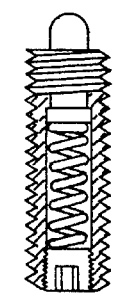

Foot-pedals 34 and 40 rest on resistance/stop mechanisms 26L and 26R respectively (FIG.3). Resistance/stop mechanisms 26L and 26R (FIG. 6 and 6A), position buttons 44 into a non-operative placement between uses and provide a quick return and reset for the foot-pedals after each use. The amount of resistance on resistance/stop mechanisms is increased or decreased to meet the desire of the operator by turning the set screw on the underside of each mechanism (FIG.6A). Resistance/stop mechanisms 26L and 26R have a limited range of travel and are adjusted to stop the foot-pedals 34 and 40 just past the point where the desired function is achieved (FIG. 6 and 6A). Buttons 44, which are attached to the underside of foot-pedals 34 and 40, engage with the buttons of the cassette player during operations.

Operations -FIGS. 1 Through 4

Figures 2, 2A:
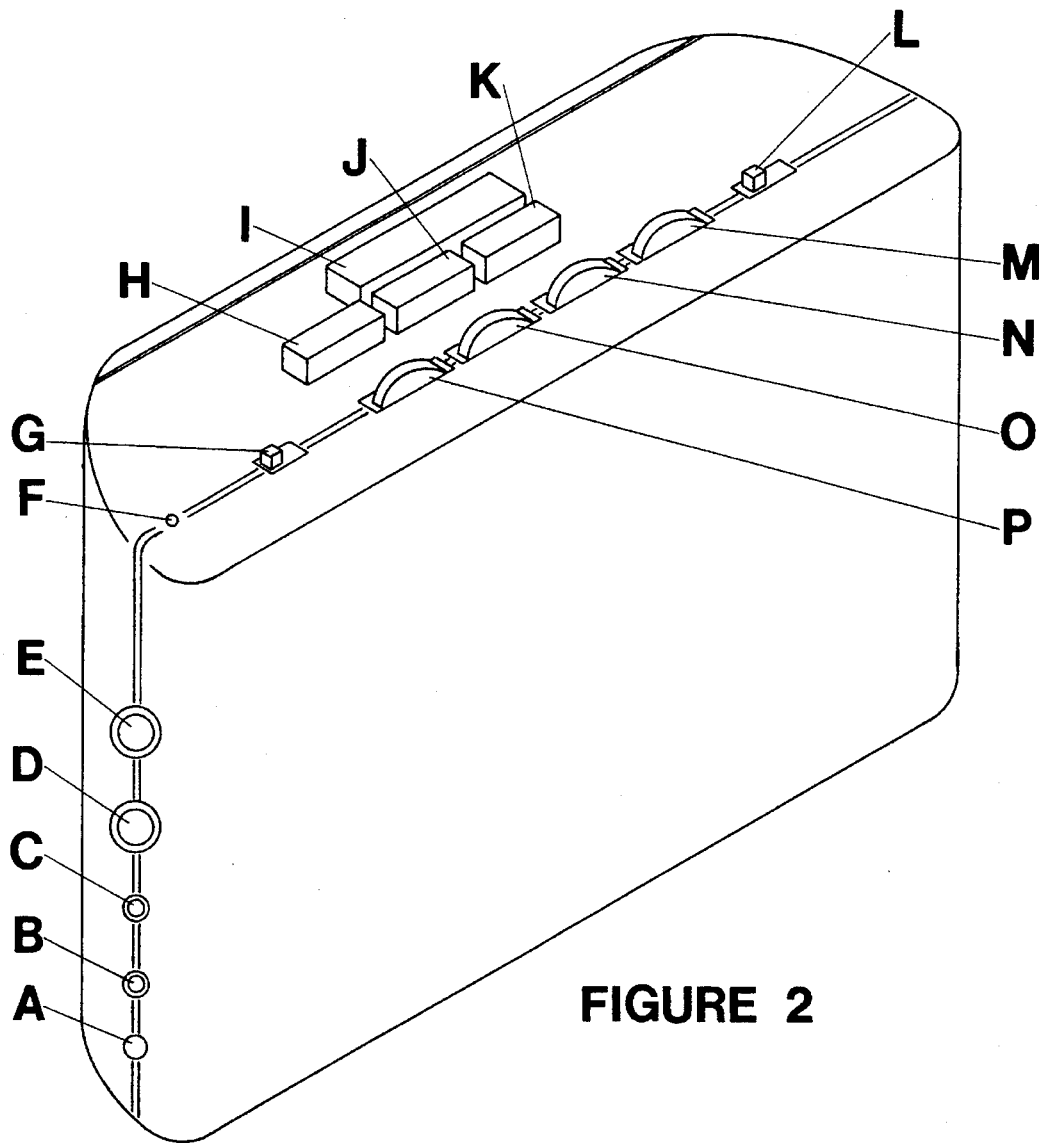
FIG. 2 is a perspective view of a specialized cassette player (IBANEZ™ RP-200 or RP-202, Prior Art), which can be operated with my compatible foot controller.
FIG. 2A is the legend of FIG. 2.

The operator first places a selected cassette tape into the cassette player (FIG.2). The operator then flips foot-pedals 34 and 40 up (FIG.3), to provide full access to carriage 22. The cassette player is then fully inserted into carriage 22 via the one open end (left), or through the top opening. The cassette player is directed in its operative position by using guide 22c of carriage 22 as a lateral stop; fully inserted, the cassette player is in contact with guide 22c and base 20. The operator then plugs in the AC adapter, headphones, and instrument patch cord (guitar, bass guitar, etc.), in the appropriate jacks (FIG. 2). At this point the operator sets the desired volume levels of the cassette player and the instrument by briefly playing the tape. The tape speed (FIG.2) is then adjusted, if necessary, to synchronize the pitch of the tape to the instrument. With the cassette player "set-up" to operate, the operator then flips foot-pedals 34 and 40 back into their operative positions.

To start the tape, the operator shifts mobile-pedal 40 fully forward into position "A" (FIG.4) and engages the play function of the cassette player by pressing down on mobile-pedal 40. Once mobile-pedal 40 is shifted fully forward, it is in position to engage the play function of the cassette player irregardless of how far left or right mobile-pedal 40 is situated. While the cassette player is in "play" mode, foot-pedal 34 is used in position "D" to rewind the tape for hands-free quick review. When the operator releases the pressure from foot-pedal 34, the tape immediately stops rewinding and begins playing again. This is repeated as often as necessary to allow the operator (instrumentalist) to find the musical passage on his or her guitar, bass, etc.

Mobile-pedal 40, in position "B", (FIG. 4), is used to engage the fast forward function and advance the tape to a specific desired musical passage, (solo for example), for review. This function can also be activated while the tape is playing as a special feature of the specialized cassette player. To stop the tape, the operator can shift the mobile-pedal 40 fully to the right, to position "C" (FIG. 4), and engage the stop function of the cassette player.

As an additional point of interest, while using my own compatible foot controller (the prototype) to learn songs, I discovered that the tape can actually be stopped or paused for several seconds with just the right amount of pressure on foot-pedal 34. As a result, the operator can review a difficult musical passage several times consecutively, pause the tape long enough to vocalize (hum or sing) the notes and find them on the instrument, and then fully engage the rewind function (with a little more pressure on foot-pedal 34). When the operator releases foot-pedal 34 (rewind/ review function), the operator/musician plays along with the tape as before. After discovering that the tape could actually be paused, with just the right amount of pressure to foot-pedal 34, I checked to see if this was possible while operating the rewind/review button by hand. I discovered that though it is possible to pause the tape using my thumb, it is much easier to hit just the right spot using the foot controller. This seems to be a result of the added, smooth resistance provided by the resistance/stop mechanism 26, though I do not wish to be bound to this theory. Furthermore, though it is possible to temporarily pause the tape by hand, it is of course impossible to do this with both hands on the instrument.

Alternative Designs and Applications

The various embodiments of my foot-controlled operational mechanism offer a great variety of alternative designs and assemblies. These modified design solutions develop and refine the basic elements and principles of the original working model shown in FIG. 1. The modified components in these designs are developed upon the objectives and criteria of the primary embodiment as established in the original description. Functional and operational characteristics of components which are described in one assembly, and then applied in later designs, are carried over unless otherwise indicated. Additional information regarding preferred construction methods and materials is also provided in the Production Models segment to follow.

Alternative Mobile Foot-Pedal System: Assembly-A, (FIGS. 7 through 7F)

The alternative designs segment of this text demonstrate a multitude of diverse mobile foot-pedals and foot-pedal support systems. These systems employ a wide variety of traverse mechanisms, multi-directional traverse mechanisms and hinge mechanisms to mount the respective foot-pedals to the support structure below. For easy identification, modified varieties of the original components are referenced with the original numbers and are further delineated with letter suffixes and primes.

Figure 7:
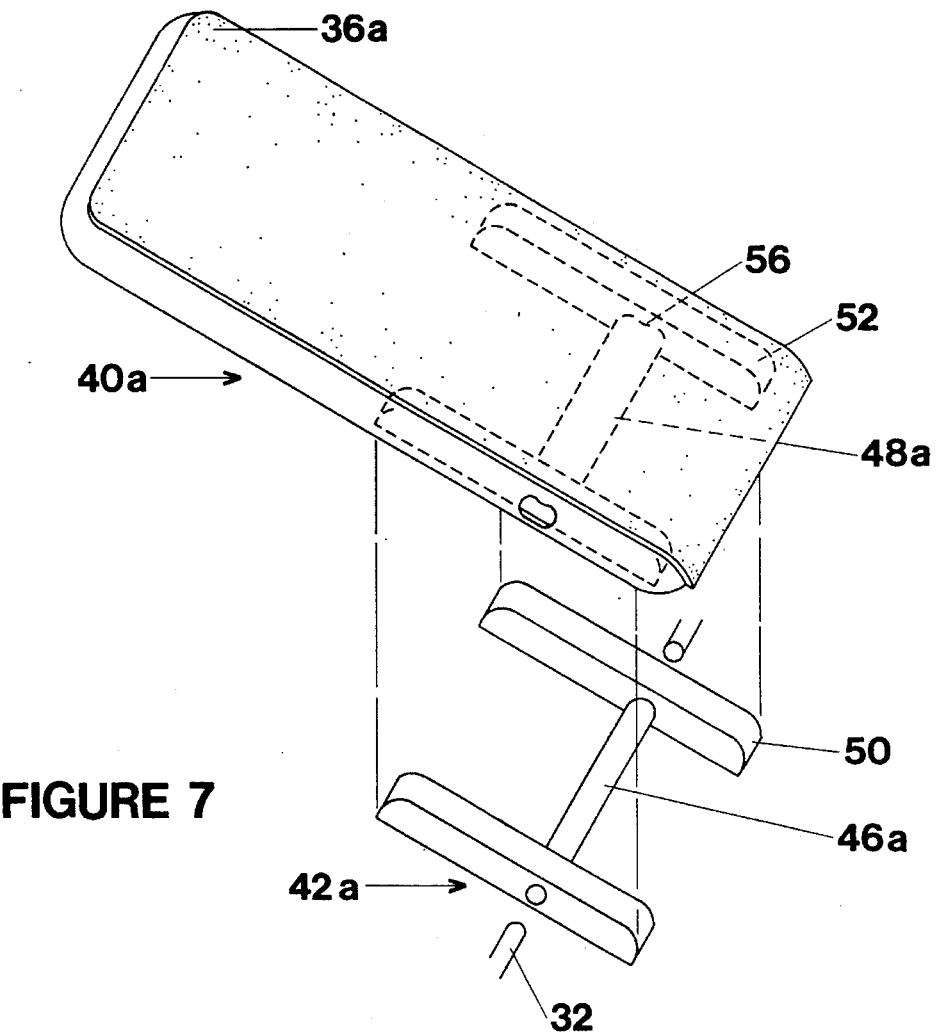
FIGS. 7 through 7F show two variations of an alternative design to the original mobile foot-pedal system in exploded perspectives, elevations, and sections.
Figure 7A:
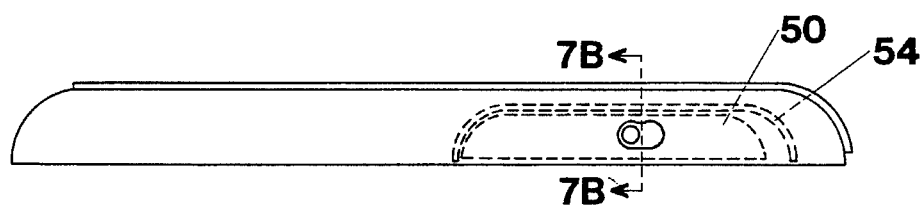
Figure 7B:
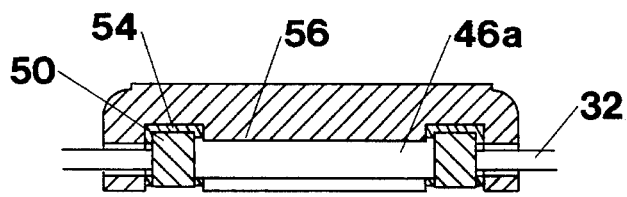

The alternative mobile foot-pedal systems in FIGS. 7 through 7F introduce the application of various solid materials in order to produce a great variety of integrated components. FIG. 7 shows an exploded perspective of one alternative mobile foot-pedal and anti-sway cartridge system. This assemblage incorporates a modified cartridge 42a in the shape of the letter H. Cartridge 42a is constructed of steel and is manufactured as one integrated unit. The two vertical members of cartridge 42a provide blades or runners 50 as shown in FIGS. 7 and 7B. The horizontal member of cartridge 42a is a cylindrical chamber 46a to encase shaft 32 as shown in FIG. 7.

A modified mobile-pedal 40a is produced with two tracks 52 to provide rigid linear guides for runners 50. Tracks 52 are fitted with steel sheathes 54 for structural reinforcement and to reduce wearing (FIG. 7B). Mobile-pedal 40a is produced with an accommodating oblong channel 48a to permit the desired operative mobility. Channel 48a connects with tracks 52 at each end while remaining open underneath to insert cartridge 42a. Channel 48a is provided with a slight downward peak or cusp 56 in the center of its top ledge. When mobile-pedal 40a and cartridge 42a are assembled, cusp 56 descends just below the top surface of chamber 46a. Cusp 56 is designed to provide an additional reference point for the operator; when mobile-pedal 40a is shifted forward and back, the peak of cusp 56 connects with chamber 46a to provide a physical bump in mobile-pedal 40a. This feature is also applied to fully seat mobile-pedal 40a into its two final operative positions. This feature is not essential to this design, but is offered as an additional functional element. To reduce wear on cusp 56, a metal sheath may also be employed. This particular system functions in a slightly different manner than the original mobile-pedal system; mobile-pedal 40a can be shifted forward and back on runners 50 and from side to side on shaft 32. FIG. 7B shows a sectional view of this design for further reference.

Modified variations of this design are also possible, for example runners 50 and tracks 52 can be substantially narrowed to provide an anti-sway cartridge which functions exclusively as a lateral stabilizer. In this further modified H-cartridge design, the respective mobile foot-pedal will actually rest on the pivot-shaft below. This principle is shown in the next alternate design.

Figure 7C:
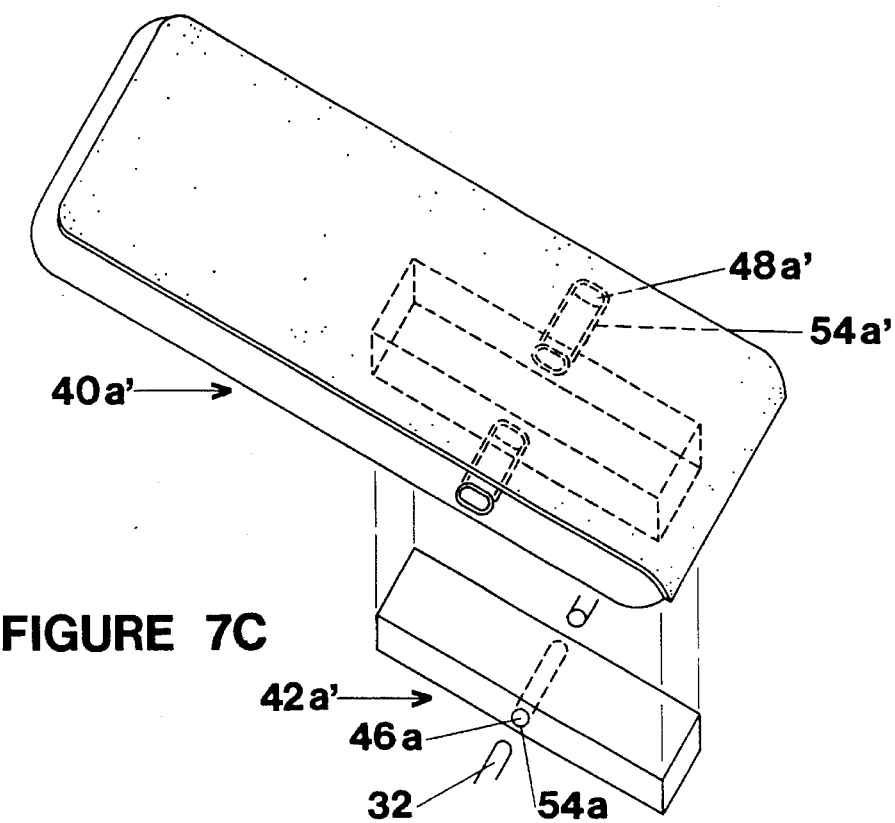
Figure 7D:
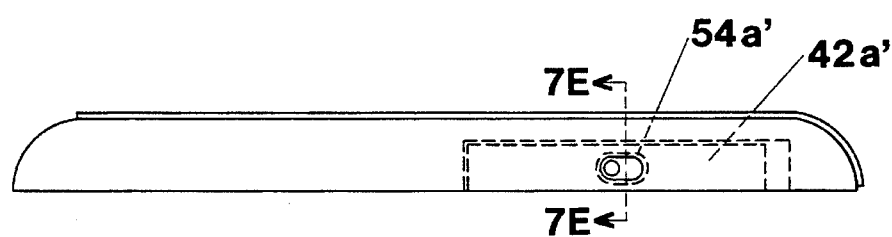
Figure 7E:
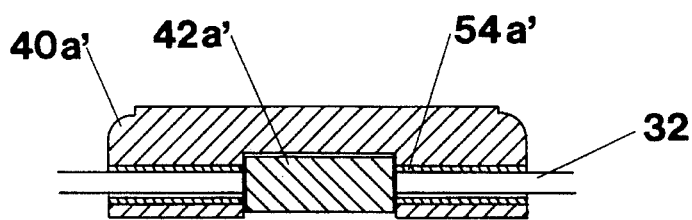

FIG. 7C through 7E illustrate another alternative variation of the Assembly-A mobile foot-pedal system. This system applies a rectangular anti-sway cartridge 42a' similar to the original cartridge 42; these components are however produced mainly with solid materials. Cartridge 42a' is again fitted in a mobile-pedal 40a' (FIGS. 7D and 7E) to provide lateral stability. Cartridge 42a' is produced with a chamber 46a to accommodate shaft 32. Chamber 46a is provided with a metal sheath 54a to reduce wearing.

Mobile-pedal 40a is designed here with two intermittent oblong channels 48a' to provide linear mobility. Channels 48a' are fitted with metal sheathes 54a' again to reduce wearing (FIG. 7E). In this design, mobile pedal 40a' actually rests on shaft 32 to provide linear and lateral mobility.

FIG. 7F shows a pivoting foot-pedal 34a to apply these alternative mobile-pedal designs in a two pedal embodiment. Foot-pedal 34a is again produced with solid material and is provided with a chamber 46a to house shaft 32. Chamber 46a is again fitted with a metal sheathing 54a to promote structural integrity and reduce wearing. A slip-resistant surface is also provided on the tops of the foot-pedals in these alternative foot-pedal systems as a standard functional element. Surface 36a is provided integrally as discussed in the Production Models segment to follow.

Alternative Mobile Foot-Pedal System: Assembly-B, (FIGS. 8 through 8D)

Figure 8B:
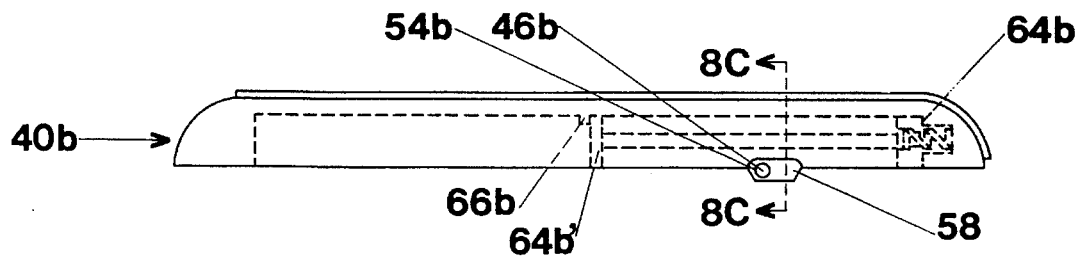
FIGS. 8 through 8E show another alternate design and assembly for the original mobile foot-pedal system in exploded perspective, plan view, side elevations, and sections.
Figure 8C:
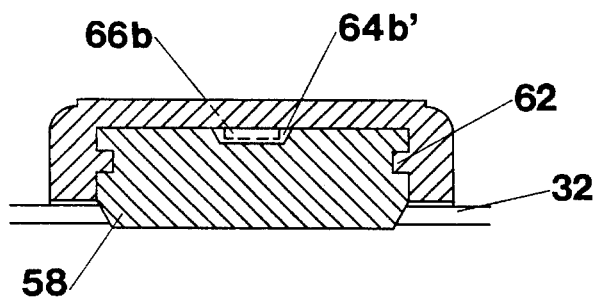
Figure 8D:
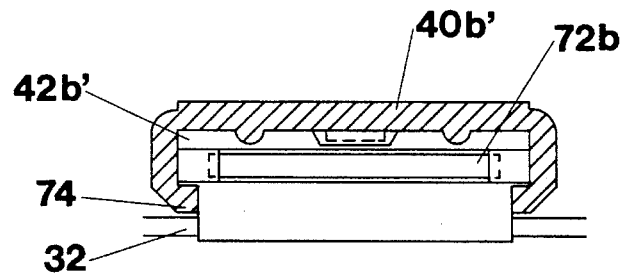

FIGS. 8 through 8D show several views of another alternative mobile-pedal and anti-sway cartridge system. Based on the parameters set forth in the original description, this assembly shows an evolution of design development made possible with my compatible foot controller. This alternate design and assembly further modifies the essential components of the former design as here described and illustrated.

FIGS. 8 through 8D show another variety of an anti-sway cartridge which also functions as an adapter component between the mobile-pedal and the support structure below. This adapter cartridge 42b is essentially a further modified cartridge 42a'. Cartridge 42b is designed with a wedge shaped mounting block 58 which extends downward as shown in FIG. 8b. Mounting block 58 provides a chamber 46b to encase shaft 32. Chamber 46b is also fitted with a sheath 54b to promote structural integrity and reduce wearing. Cartridge 42b provides substantial surface to support a mobile-pedal 40b and is joined with mobile-pedal 40b with interlocking male and female fittings or joints. These joints securely interlock and join mobile-pedal 40b with cartridge 42b while leaving enough tolerance or play for operative mobility. This interlocking system can be accomplished with a multitude of shapes and sizes which incorporate basic mortise and tenon principles. These interlocking parts may also be fitted with metal sheathes to reduce wearing. In this particular design application, cartridge 42b is provided with two mortises 60 to receive the tenons 62 inside mobile pedal 40b as shown. This placement can of course be reversed to provide substantially equivalent results.

Mobile-pedal 40b is again provided with start and finish mechanical stops in this assembly to limit its travel distance within the necessary operative positions. A mechanical stop 64b is located toward the back end of mobile-pedal 40b and is provided integrally as shown (FIG. 8A, 8B). A mechanical stop 64b' is fitted in place and secured toward the center of mobile-pedal 40b, after cartridge 42b is inserted in mobile pedal 40b; mobile pedal 40b is provided with two parallel mortises 60b and a centrally located mounting clip 66b to securely fasten stop 64b'. Cartridge 42b is produced with an appropriate passage 68 at its top surface to avoid contact with mounting clip 66b during assembly (FIGS. 8 and 8A).

As FIGS. 8A and 8B illustrate, this design solution also incorporates a mechanical reset system. This system employs two male posts 70 which extend out of cartridge 42b as shown in FIG. 8. Posts 70 are mounting rods to guide and direct two compression springs or recoils 72 as shown in FIG. 8A. Two larger female chambers 46b' are located inside mechanical stop 64b and are provided integrally. Chambers 46b' are designed to encase recoils 72 as shown in plan view, FIG. 8a. This re-set system is provided to return mobile-pedal 40b back to its original starting position after substantial pressure is released from the top surface of mobile-pedal 40b; when pressure is released from mobile-pedal 40b, recoils 72 expand and reset mobile-pedal 40b. Once the foot-pedal is shifted forward to engage the play function, it is automatically returned to align with the secondary functions; fast forward and stop. This added function also provides the operator with a consistent starting point and orientation at the onset of each use. FIG. 8A shows a plan view of an Assembly-B design with this reset system applied. Though one centrally located compression recoil could serve a similar function, a system with two recoils 72 is preferred to promote equilibrated tension between mobile-pedal 40b and cartridge 42b. This reset system can also be accomplished with extension springs mounted between mobile pedal 40b and cartridge 42b at the opposite (front) of this assembly, however, the placement of compression recoils 72 as pushing mechanisms is the preferred application. The reset system shown in this assembly is of course not essential in applying an Assembly-B design. FIG. 8D shows a variation of the Assembly-B mobile-pedal system in profile for visual reference. In this design, a cartridge 42b' is retained substantially inside a mobile-pedal 40b' by two inward flanges 74 of mobile-pedal 40b'. To apply this design, flanges 74 are intermittent and are provided for the length necessary to retain cartridge 42b'; the underside of mobile-pedal 40b 'is left open without flanges 74 at its opposite (front) end to insert cartridge 42b' as shown with the former design in FIG. 8. This alternative design also incorporates a reasonable substitute for recoils 72. FIG. 8D shows the application of crowned flat-spring, recoil 72b. Recoil 72b is a convex flat-spring which is retained in an accommodating recess in the back-end of cartridge 42b'. Recoil 72b simply flattens out when mobile-pedal 40b' is shifted forward and re-sets after pressure is released from mobile-pedal 40b'.

Figure 8E:
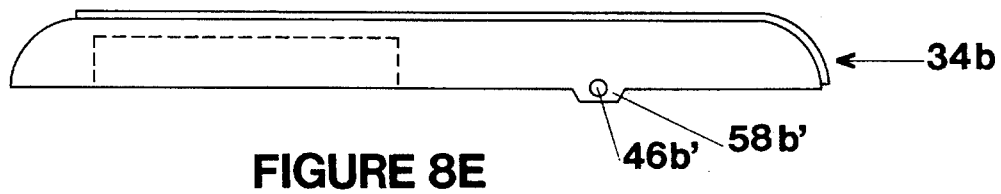

To provide a stationary pivoting foot-pedal at the same vertical elevation as mobile-pedal 42b or 42b', a pivoting foot-pedal 34b is provided with a mounting block 58b' integrally, as shown in FIG. 8E. Mounting block 58' spans the full width of its respective foot-pedal to provide optimal structural integrity. Mounting block 58b is provided with a chamber 46b' as shown.

The foot pedals illustrated in Assembly-B also show chamber 46b and 46b' mounted on-center with the bottom edge of its respective foot-pedal. This placement shifts the central pivot-axis of shaft 32 in-line with the mounting surface for buttons 44. This design modification is applied to position the travel arc of button 44 in the most parallel alignment with the control buttons of the respective cassette player. Though this relative orientation is not absolutely critical, it is preferred.

Additional information regarding preferred construction methods and materials is again provided in the Product/on Models segment to follow.

Alternative Foot-Pedal Mounting System: Assembly-C, (FIGS. 9 through 9C)

The foot-pedal designs shown in Assembly-B provide the opportunity to apply a variety of foot-pedal mounting systems. These mounting systems employ the foot-pedals with foot-pedal mounting blocks 58 shown in the previous assembly. The components in these mounting systems are illustrated in an enlarged scale for the purpose of demonstration.

FIG. 9 shows a modified pivot-shaft 32c with a flat top-surface and a radial bottom edge. Shaft 32c is not severely restricted to a specific size or radius provided it cooperates with its adjacent foot-pedal to create a sufficient arc for the established intended results. In the system illustrated, shaft 32c is 45 of a complete radius with a 12 mm top surface. Shaft 32c is coupled to each foot-pedal with a matching cavity 76 located in the respective mounting blocks 58c (FIG. 9). Cavity 76 is again provided with a reinforced sheathing 54c as shown.

In a respective mobile foot-pedal 40c, cavity 76 is provided in a mounting block 58c of a cartridge 42c. Cartridge 42c in Assembly-C is simply a further ramification of cartridge 42b (shown in the former design); the modifications being the application of shaft 32c and the additional size in block 58c to accommodate the larger shaft (FIG. 9). A pivoting foot-pedal 34c is here again provided with a built-in stationary mounting block 58c also demonstrated in FIG. 9. Mobile-pedal 40c is free to shift forward and back on cartridge 42c and from side to side on shaft 32c. Foot-pedal 34c is contained within its mounting structure to restrict lateral mobility as the original foot-pedal 34, (FIG. 9C).

This mounting system employs a pair of modified flanged bushings for each foot-pedal. A bushing 30c is shown in FIG. 9A as an incomplete radius with a wedge 78 in the upper right (back) quadrant. A bushing 30c' is also provided and is essentially a mirror image of bushing 30c; bushing 30c' also features a removable back plate or access panel 80 as shown in FIG. 9B. Panel 80 is press-fit in place with interlocking fittings and is held secure by friction. Panel 80 is provided to apply alternate assemblies described and illustrated in the Production Models segment to follow.

This system incorporates a central shaft support 28c, located between the two respective foot-pedals, to provide a shaft 32c, and a pair of bushings 30c and 30c' for each respective foot-pedal (FIG. 9C). To accommodate cassette players with control buttons placed in immediate proximity, such as the IBANEZ™ models, the shape of each respective foot-pedal is also modified in this system. FIG. 9C shows foot-pedals 34c and 40c with inward jogs to provide buttons 44 in proximity with each other.

This alternative mounting system also functions in a slightly different manner than the former designs; in Assembly-C, shaft 32c remains pivotally interlocked to its respective foot-pedal and shifts or rotates in-place using bushings 30c and 30c' as sockets. These modified bushings are also designed to provide an additional function; the front wall of wedge 78 provides a mechanical stop 64c to catch the respective foot-pedals in a neutral upward incline (FIG. 9A). Foot-pedal 34c can be held stationary in an inoperative neutral position with the friction applied by bushings 30c and 30c'. Mobile-pedal 40c is held stationary by the friction between the bottom edge of mobile-pedal 40c and the base platform 20c. The tension provided by the re-set system in mobile-pedal 40c serves a secondary function here in Assembly-C; the expansive force pushing toward the bottom edge of mobile-pedal 40c, is used here to set and release mobile-pedal 40c in and out of the its neutral placement. These features offer an additional convenience for the operator by providing an accessible neutral placement for the foot-pedals; the pedals will rest close-at-hand to simplify access to the controls of the cassette player. FIG. 9A shows the operative and neutral positioning of shaft 32c inside bushing 30c. FIG. 9C shows a plan view of this alternate mounting system applied. The principles applied in this system can be applied to other foot-pedal designs in this text.

Unconventional machined components shown in this text may be procured through RMS of Minneapolis, Minn. 55433. For an extensive resource guide to manufacturers, suppliers, and distributors of conventional and custom shafts, bushings, and other machined parts, refer to the Thomas Register catalog series. The Thomas Register of American Manufacturers' is an extremely comprehensive resource guide to building products, manufacturers', and suppliers. Thomas Register catalogs can be found in the public library system in America or call (212) 290-7262 or (212) 290-7277.

Alternative Foot-Pedal Mounting System: Assembly-D, (FIGS. 10 through 10D)

Figure 10:
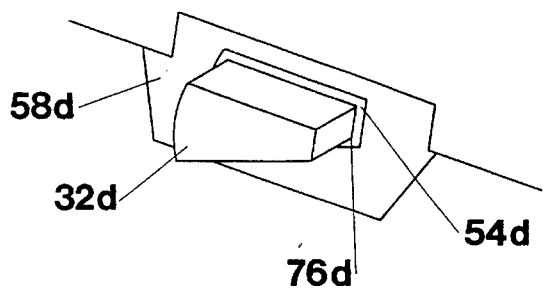
Figure 10:
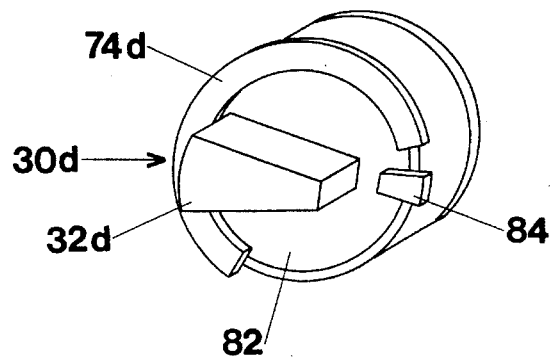
Figure 10:
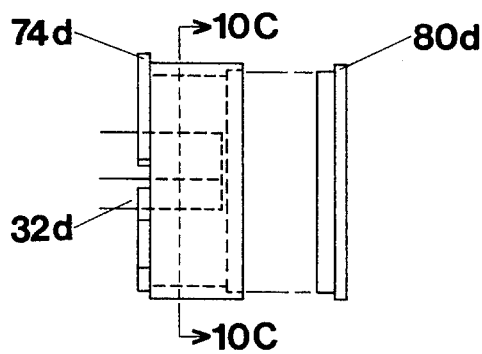
Figure 10:
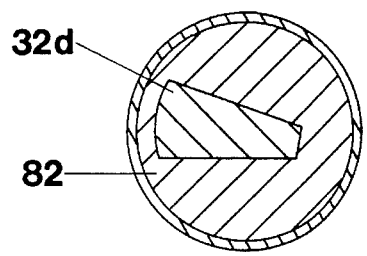
Figure 10:
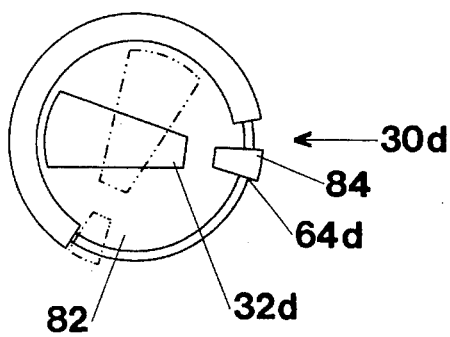

FIGS. 10 through 10D show another modified foot-pedal mounting system. This system is also applied with the foot-pedals shown in Assembly-B.

FIG. 10 shows an alternate shaft 32d designed in a wedge shape. Shaft 32d is again coupled to each respective foot-pedal with an accommodating mounting block 58d. Mounting block 58d is provided with a matching wedge-shaped cavity 76d to contain shaft 32d as shown. Cavity 76d is provided with a reinforced sheath 54d (FIG. 10). Just as Assembly-C, these fittings interlock this further modified shaft to each respective foot-pedal. Shaft 32d is then fitted inside two inverse radial cams 82 shown in various views. Shaft 32d is intentionally elongated to cross the center point of this radial system; this placement distributes stress downward, more evenly across cam 82 to provide a more stationary support. Shaft 32d also extends equa-distantly above and below the center point of cam 82 to provide the most effective (perpendicular) arc for the foot-pedals. The top ledge of shaft 32d rests parallel with the operative slope of the foot-pedal at approximately 20 degrees.

Shaft 32d and cam 82 are contained within a modified flanged bushing 30d shown in several views. Bushing 30d is again designed with a press-fit access panel 80d as shown in FIG. 10B. Bushing 30d employs a flange 74d which extends or protrudes inward as well as outward to retain the system within. Flange 74d is designed with a segmental break to allow the system to be rotated within a limited range. Flange 74d is designed to provide sufficient clearance to allow the adjacent foot-pedals to be pivoted in two directions; each respective foot-pedal is again free to pivot on a central axis for its intended primary function.

A key 84 extends out from cam 82 and is permanently secured in place. Key 84 connects with flange 74d to provide a built-in stop 64d to hold the respective foot-pedal in a neutral upward incline, as shown in FIG. 10D. Key 84 is also designed to radiate from the center point of cam 82 to provide a clean contact with flange 74d in the neutral mode. FIG. 10D shows shaft 32d in its operative and neutral positioning.

This system also incorporates three shaft supports and can be applied as the former design in Assembly-C (FIG. 9C). Modified foot-pedals, as shown in FIG. 9C, may also be employed to provide buttons 44 in greater proximity to each other.

Alternative Mobile Foot-Pedal and Mounting System: Assembly-E, (FIGS. 11 to 11D)

Figure 11:
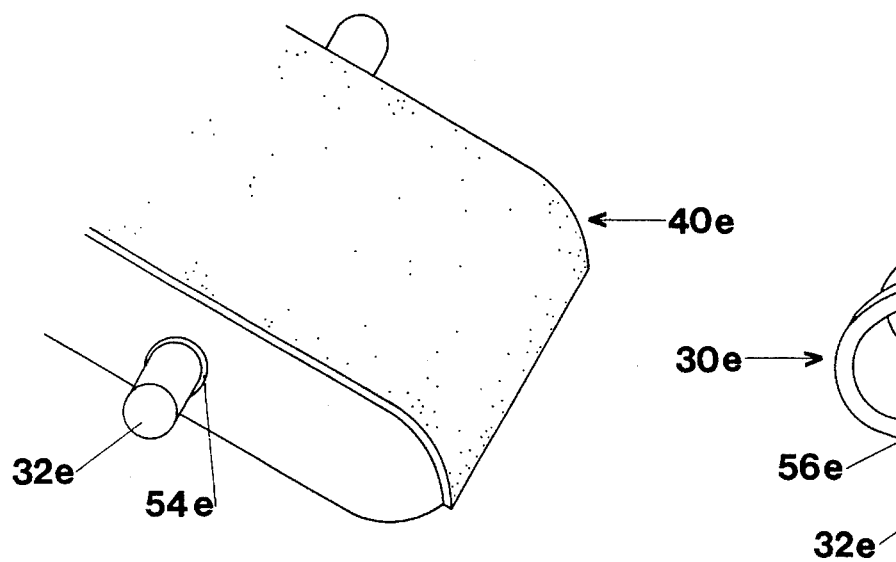
FIGS. 11 through 11D show an alternate mobile foot-pedal design and mounting system in perspectives, elevations, and plan view.
Figure 11A:
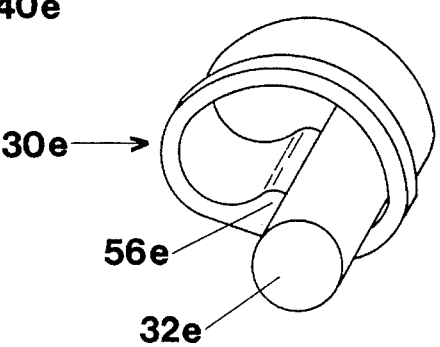
Figure 11B:
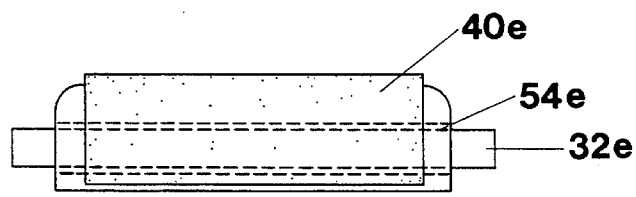
Figure 11C:
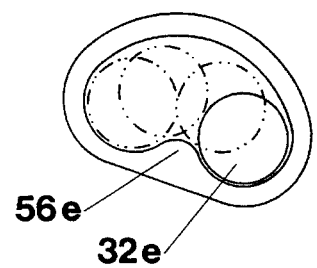
Figure 11D:
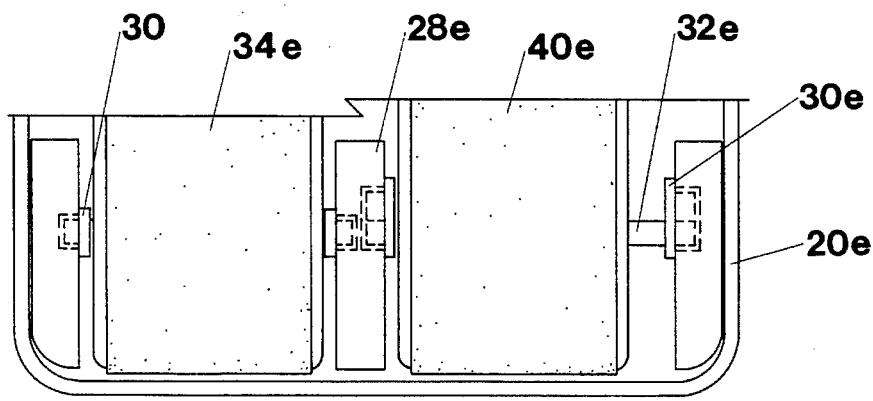

FIG. 11 through 11D show another alternative design solution to provide the objects of the original mobile foot-pedal system. This assembly applies the essential elements and principles of the former designs, however these elements are arranged in an inverse order.

FIG. 11 shows a round shaft 32e inserted through a mobile-pedal 40e. Mobile-pedal 40e is provided with a metal sheath 54e to provide a reinforced housing for shaft 32e. In this specific application, shaft 32e is 7 mms in diameter and is fitted in sheath 54e with sufficient tolerance to move freely from side to side.

This design also incorporates a pair of modified bushings 30e as shown in FIG. 11A and 11C. Bushing 30e is a double-lobed bushing with a peak or cusp 56e in the center of its lower ledge. Cusp 56e is designed with a moderate gradational slope to allow shaft 32e to be shifted forward and back into two operative positions, as shown in FIG. 11C. The lobes of bushing 30e are one-third as deep as shaft 32e to provide substantial radial surface to cup shaft 32e. The inside height of bushing 30e is enlarged and peaked radially to allow shaft 32e to be shifted forward and back as shown. The lower ledge of bushing 30e is mounted in its respective shaft support at a diagonal pitch substantially parallel with mobile-pedal 40e (FIG. 11C).

In order to provide the desired linear mobility, the distance between the center of shaft 32e when seated in each respective lobe is substantially equal to the distance between the center points of the (front and back) buttons of the cassette player. This principle is provided to place the respective button 44 in the correct operative position to engage the buttons of the cassette player. This measurement dictates the necessary linear mobility of mobile-pedal 40e and button 44 and will vary from one cassette player to another. The distance between the center points of the buttons in the primary embodiment is 9 mms as established in the original description. Button 44 is rounded-off at its underside or contacting surface in this design to avoid unintentional contact with the buttons of the cassette player when shifting mobile-pedal 40e forward and back.

Just as Assemblies C and D, a third shaft support 28e is secured to base 20e between the two foot-pedals. Foot-pedal 34e is mounted in this design with the original bushings 30. Modified foot-pedals may again be required to apply this system if the control buttons of the cassette player are placed in immediate proximity. FIG. 11D shows this alternate system applied.

Further modifications of this assembly are possible. For example, mounting blocks 58 may be employed in this design to couple each respective foot-pedal to the support structure (as demonstrated in the former designs). Another variation of this assembly may eliminate cusp 56e which is not absolutely essential to this design.

One variety of this system can be manufactured in successive order (from left to right) as described in the original description. A molded plastic model of this design, as discussed later in this text, may employ a removable back access panel as shown in the former designs.

Alternative Foot-Pedal Biasing Systems

The foot-pedal biasing structure used in the original design can be modified or replaced to provide additional design solutions. These alternative reset systems parallel and augment the original resistance/stop mechanism 26 shown in the primary embodiment.

Alternative Foot-Pedal Biasing System: Assembly-F, (FIGS. 12 through 12B)

Figure 12:
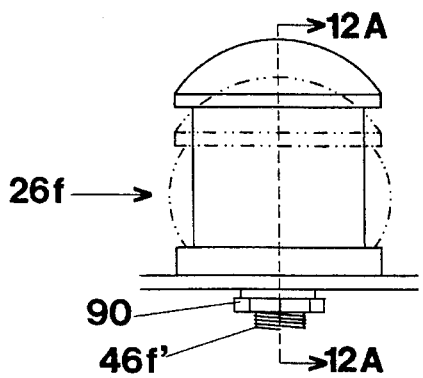
FIGS. 12 through 12B show two varieties of an alternative foot-pedal biasing system in elevations and section.
Figure 12A:
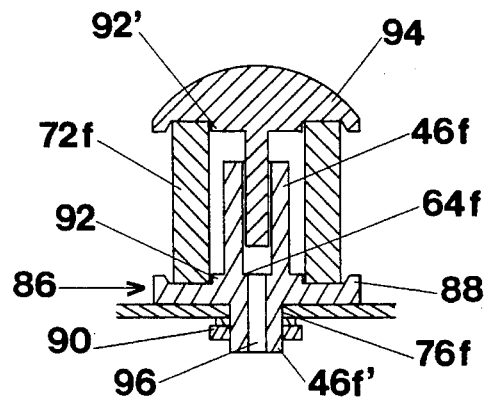
Figure 12B:
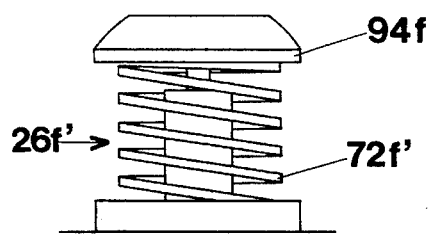

FIGS. 12 and 12A show one variety of an alternative resistance mechanism, 26f. Resistance mechanism 26f employs a rubber tube or cylinder to resiliently bias the respective foot-pedal.

A reinforced-steel mounting frame, generally indicated at 86, is designed to provide a rigid mounting structure for resistance mechanism 26*f*. Frame 86 is produced with a flanged plate 88 as shown in section in FIG. 12A. Frame 86 provides a threaded chamber 46*f* which extends downward through a mounting cavity 76*f* as shown in FIG. 12A. A hexagonal mounting nut 90 is used in combination with a conventional lock-washer to fasten frame 86 securely; chamber 46*f*' may also be screwed into a female threaded socket, tapped into wall 22*b*, or other suitable mounting surface (as shown in the Production Model segment to follow). A second chamber 46*f* is also provided integrally with frame 86 and extends upward from plate 88 as shown. Chamber 46*f* is designed with a retaining ring 92 at its base. A rubber cylinder, recoil 72*f*, is fitted around retaining ring 92 and rests on plate 88. Recoil 72*f* is a resilient tube made of firm, open-cell sponge rubber. Recoil 72*f* has an inside diameter of 14 mms and an outside diameter of 32 mms and is 25 mms high. A flanged, capped-piston 94 is recessed inside chamber 46*f* and rests on recoil 72*f* as shown in FIG. 12A. Piston 94 is also designed with a retaining ring 92' to maintain recoil 72*f* in place. Retaining rings 92 and 92' also provide spacers inside recoil 72*f* to keep recoil 72*f* from binding with chamber 46*f* during operations. Piston 94 is also constructed of a non-porous hard material and is designed with a smooth radial cap to support the respective foot-pedal.

A built-in stop mechanism is here again provided to avoid damaging the cassette player. Plate 88 provides a built-in mechanical stop 64*f* as shown in FIG. 12A. Piston 94 is designed to travel a limited distance within chamber 46*f*; the distance between the bottom of piston 94 and the top of plate 88 is equivalent to the travel distance required to engage the control buttons of the respective cassette player.

A hollow breather 96 is provided through plate 88 and chamber 46*f*' to allow air to flow freely. Adequate clearance is also provided between piston 94 and chamber 46*f* to prevent trapped air from hindering movement during operations. When pressure is applied to the cap of piston 94, recoil 72*f* deflects or bows as shown in FIG. 12.

The resistance mechanism shown in FIGS. 12 and 12A may also incorporate a more conventional spring or recoil device. FIG. 12B shows alternate resistance mechanism 26*f*' with a compression spring, recoil 72*f*' to provide another alternate design application. Resistance mechanism 26*f*' is designed with a flat-top piston 94*f* (as shown) to provide additional stability for the respective foot-pedal when desired.

Another variety of this biasing structure can employ a T-shaped capped-piston to provide even further support for the respective foot-pedal. In this design, the horizontal member of the T-shaped capped piston will extend laterally (with the width of the foot-pedal) to provide additional support. The horizontal member of this alternative piston 94 will employ a radial top ledge to minimize surface contact with the foot-pedal for ease of operations. This design further includes a protruding cleat or key on the vertical extension of the piston designed to lock into a vertical female keyway inside the respective chamber 46*f*. This feature will prevent the T-piston from rotating in-place during operations.

*Open-cell sponge-rubber is a highly resilient natural material which is provided in sheets and can be punch-cut into cylinders for this application. Open-cell sponge-rubber is manufactured in three grades of density: soft, medium, and firm. The resilient properties of this product are also determined by the size or volume of the material. The grade and dimensions offered in this alternative resistance mechanism are established from successful trials performed within these parameters. These specifications can be manipulated further to effect the functional characteristics of this material. For additional assistance in applying or procuring sponge rubber, contact Potomac Rubber Co. Inc. of Capitol Heights, Md.

Alternative Retaining Structures

The various embodiments of my foot controller offer several alternative design solutions to the original retaining system, carriage 22. These designs incorporate additional structural modifications to alter and enhance the function of the original retaining structure.

Alternative Retaining System: Assembly-G, (FIGS. 13 through 13D)

Figure 13:
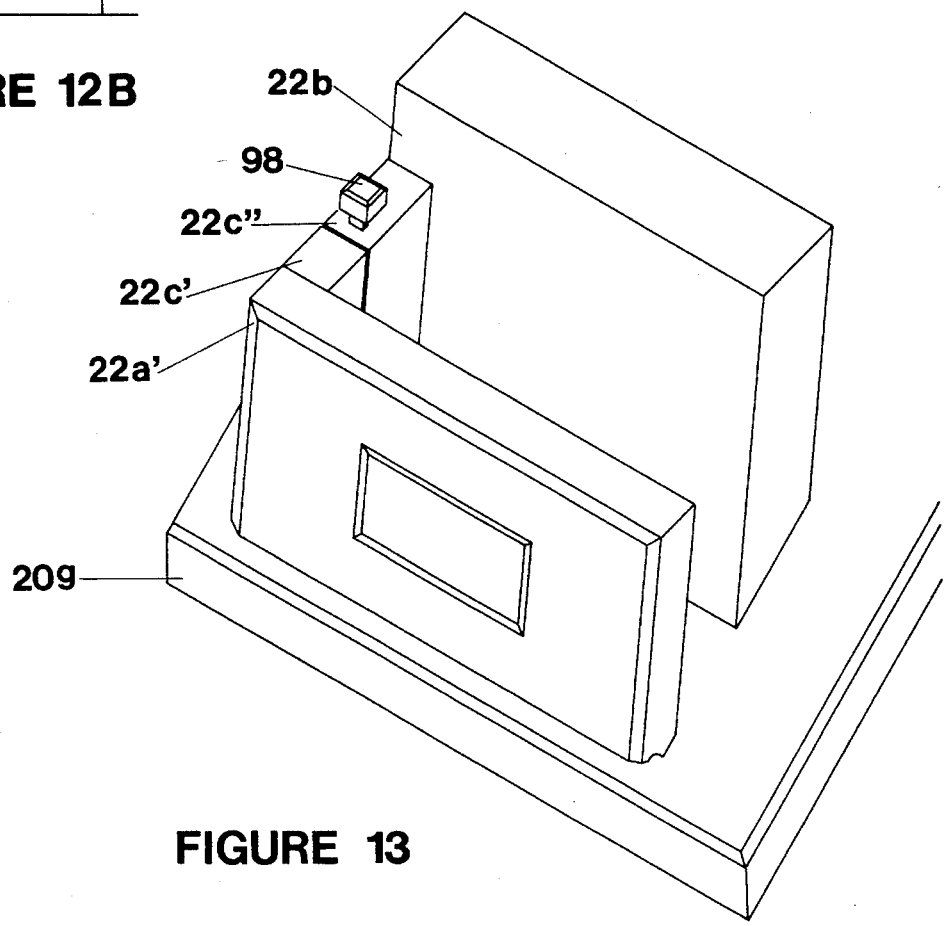
FIGS. 13 through 13E show various alternate retaining systems where the front wall is pivotally hinged to the base.

FIG. 13 shows a general view of an alternative retaining structure where the fore wall of the carriage is operatively hinged to the base. This feature can be applied in combination with a variety of lock and release mechanisms to provide greater access to the cassette player. FIGS. 13 through 13E show one example of a retaining system with a pivotally hinged front wall 22*a*' applied with a locking release mechanism. This particular retaining system provides a convenient trigger button 98 to allow the operator to open wall 22*a*' with the push of a button. This structure is also designed to be assembled with mortise and tenon fittings to provide a simplified and cost-effective assembly.

Figure 13A:
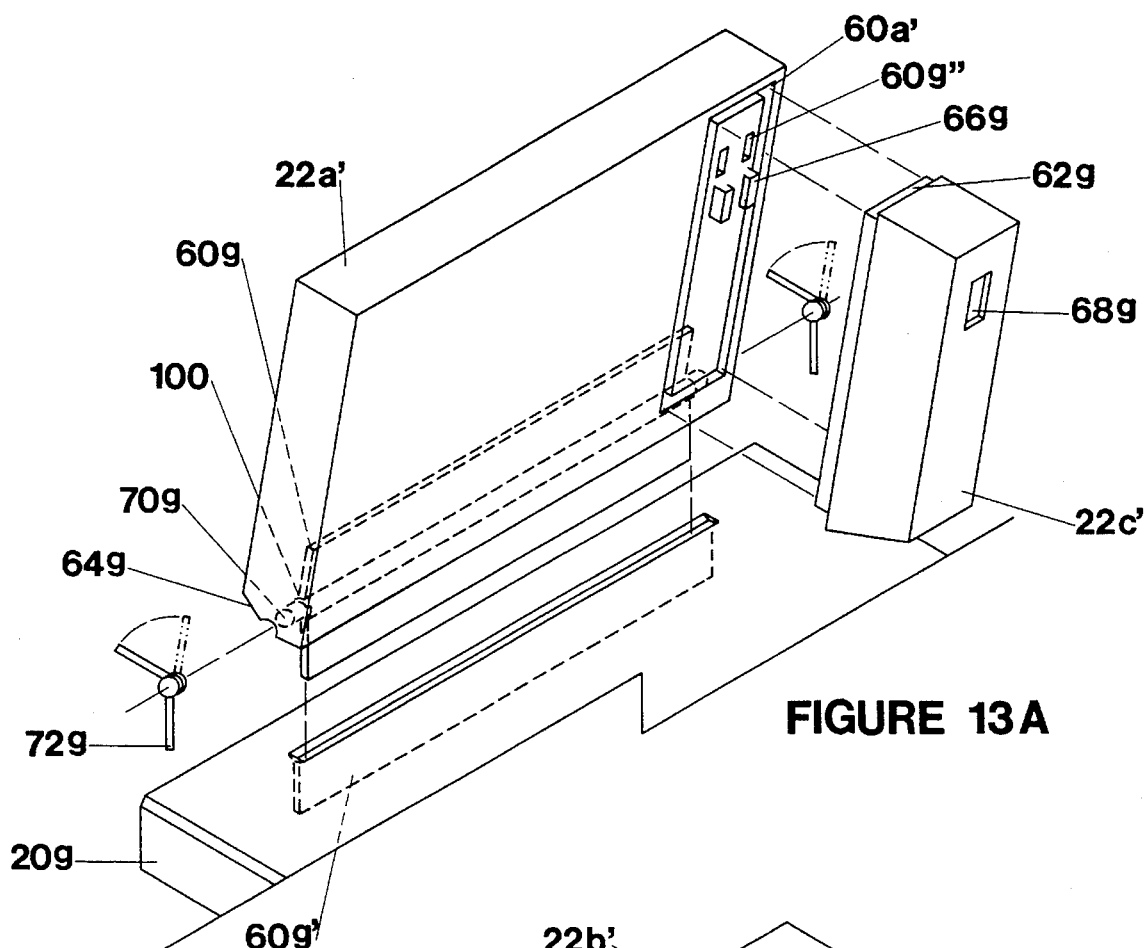
Figure 13A:
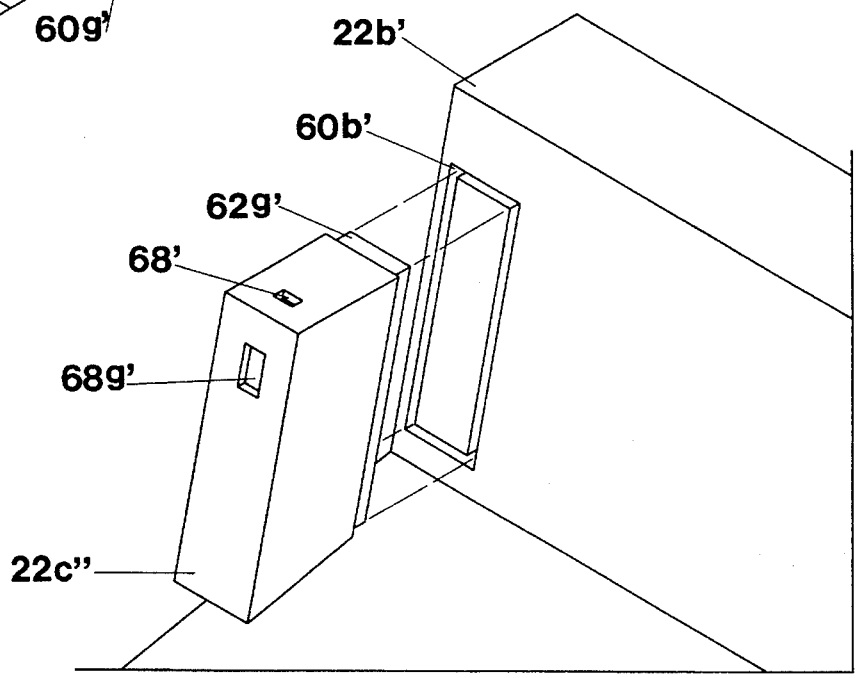
Figure 13:
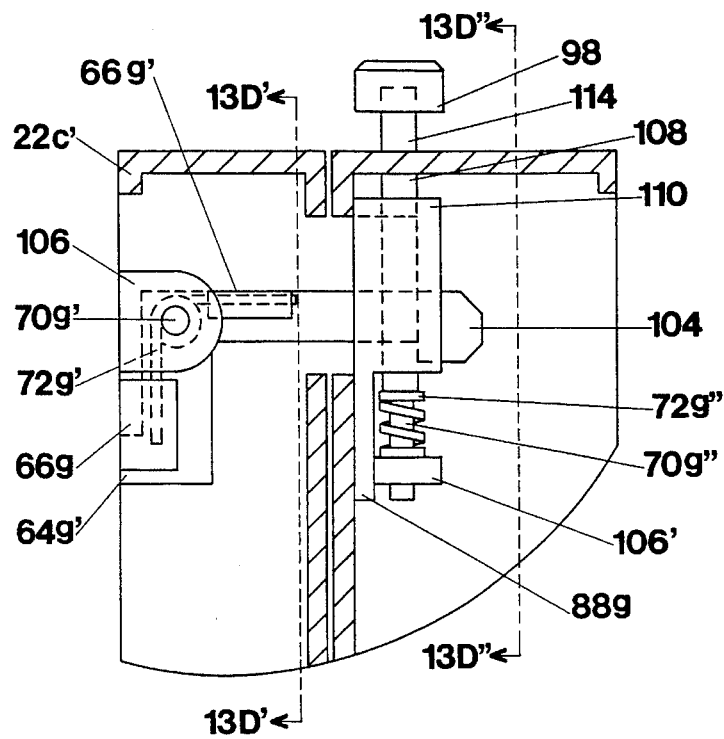
Figure 13:
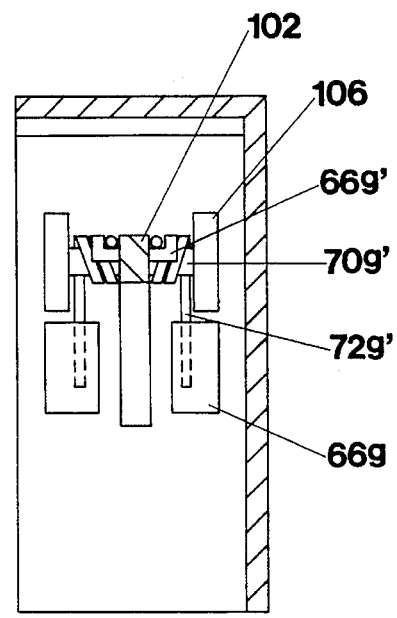
Figure 13:
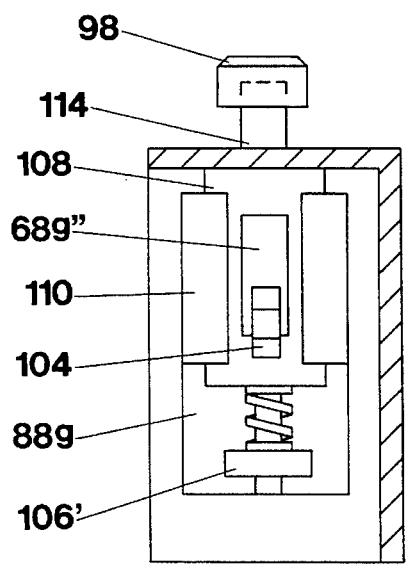
Figure 13:
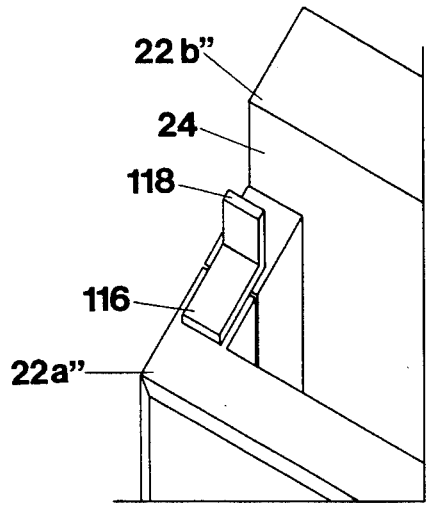

FIGS. 13A and 13A' show an alternate design and assembly of the former retaining system which is engineered to apply this design. A piano hinge 100 is employed to pivotally mount wall 22*a*' to its respective base 20*g*. Hinge 100 spans the majority of the length of wall 22*a*' to provide a rigid connection between wall 22*a*' and base 20*g*. Hinge 100 is provided with an extending arbor or post 70*g* at each end. A light-duty torsion spring, recoil 72*g*, is fitted on each post 70*g* in order to provide an outward rotational force to wall 22*a*' when assembled. Recoils 72*g* are shown in their neutral and loaded positions to illustrate this principle. Hinge 100 and recoils 72*g* are fitted and bonded securely in accommodating slots or mortises 60*g* and 60*g*' provided in wall 22*a*' and base 20*g* respectively. The circumference of hinge 100 is partially recessed inside wall 22*a*' and base 20*g* as best shown in FIG. 13C. Hinge 100 is mounted toward the inside bottom edge of wall 22*a*' to place the pivot-axis of hinge 100 inward, toward the cassette player. This orientation reduces the arc of the bottom edge of wall 22*a*' (when swinging open) to avoid unessential contact between wall 22*a*' and the respective cassette player. This placement also conceals hinge 100 to provide a finished visual appearance (FIG. 13). Wall 22*a*' is also provided with a chamfered or beveled bottom ledge to provide a built-in mechanical stop 64*g*. Stop 64*g* is employed to limit the rotational travel-distance of wall 22*a*' during operations (FIG. 13C). The pitch of the bevel may be increased to further extend wall 22*a*' as desired.

As FIGS. 13A through 13A' illustrate, this retaining structure employs two hollow walls 22*c*' and 22*c*" which extend from walls 22*a*' and 22*b*' respectively. Wall 22*c*" extends further than wall 22*c*' to provide a retaining guide to position the cassette player. Walls 22*c*' and 22*c*" also provide a housing to apply this lock and release mechanism. FIG. 13A shows wall 22a' with a rectangular mortise 60a' to insert and mount wall 22c'. Wall 22c' is provided with a matching concentric tenon 62g to cleanly and securely fasten these components together. Wall 22a' is designed with two rectangular mortises 60g", located inside mortise 60a', to facilitate this assembly (FIGS. 13A and 13B). Two mounting clips 66g are also provided integrally below mortises 60g". Mounting clips 66g are designed to turn inward, back toward wall 22a', with successive 90 degree angles as best shown in FIG. 13B. Wall 22c' is provided with a rectangular passage 68g in the upper portion of its front face.

FIG. 13A' shows wall 22b' and wall 22c" with mortise 60b' and a tenon 62g' fittings to facilitate this assembly. Wall 220" is again provided with a passage 68g' in its front panel as shown. Wall 22c" is also provided with a passage 68' in its top ledge as well. FIG. 13B shows a cut-away exploded perspective of this lock and release mechanism under assembly. A multi-directional lever arm 102 is designed with extending posts 70g' in order to be pivotally hinged to wall 22a'. Lever 102 is provided with a catch 104 at the front end of its horizontal extending arm. Lever 102 and catch 104 extend through passage 68g when assembled. Catch 104 descends downward, perpendicular to the horizontal arm of lever 102 at its inside edge. Catch 104 is beveled inward at its front top edge to avoid contact with wall 22c" during operations. Lever 102 is provided with L-shaped mounting clips 66g' which extend upward, parallel with the top ledge of lever 102. The vertical extension of lever 102 is designed with a mechanical stop 64g' which contacts wall 22a' when assembled. Stop 64g' maintains the spacing between lever 102 and wall 22a' to provide lever 102 with a consistent starting point during operations. Lever 102 is free to pivot in-place in a counter clockwise direction. Two torsion springs, recoils 72g' are mounted on posts 70g' to apply a downward rotational force to lever 102. Recoils 72g' are fitted on posts 70g' with the upper (inside) arm of recoil 72g' secured in mounting clips 66g'. Recoils 72g' also provide spacers between lever 102 and its respective mounting structure to keep lever 102 aligned during operations. Recoils 72g' are again shown in their neutral and loaded positions for reference. Two 0-brackets 106 are employed to mount lever 102 to wall 22a'. Brackets 106 are provided with tenons 62g" in order to be fastened to wall 22a'. Brackets 106 are fitted on posts 70g' of lever 102 after recoils 72g'. Brackets 106 are then mounted to wall 22a' via mortises 60g" as shown. The lower (outside) arm of recoils 72g' are then clipped into mounting clips 66g to spring-load lever arm 102. Wall 22c' is then fitted and adhered to wall 22a'.

The receiving assembly of this lock and release mechanism is also shown in perspective in FIG. 13B. A movable gate 108 is provided in this assembly to hold and release catch 104 during operations. Gate 108 is designed with a vertical passage 68g" to receive catch 104. The lower edge of passage 68g" is aligned with the underside of the horizontal arm of lever 102 once assembled (FIG. 13C and 13D). Gate 108 is retained in a C-bracket 110 inside wall 22c". C-bracket 110 is provided integrally on the inside front edge of wall 22c". C-bracket 110 extends downward between gate 108 and wall 22c"to provide a mounting plate 88g as shown. Gate 108 is inserted upward into bracket 110 to the point where the shoulders 112 of gate 108 are in contact with the inside top surface of wall 22c". Gate 108 is designed with a neck 114 which extends upward through wall 22c" via passage 68g' as shown. Neck 114 is then press-fit into trigger button 98 with an accommodating mortise 60c' provided in trigger 98. Gate 108 is designed with a post 70g" which extends downward as shown. Post 70g" provides a rigid guiding rod to direct gate 108. Post 70g" also provides a mount for a compression spring, recoil 72g". Recoil 72g" provides a continuous upward force to gate 108 to reset this assembly after trigger 98 is engaged. Post 70g" is retained inside an 0-bracket 106' as shown in FIG. 13B. Bracket 106' is press-fit into an accommodating mortise provided in mounting plate 88g (shown assembled).

FIG. 13C shows an elevation of this entire retaining system assembled. To demonstrate the spatial relationship of these interlocking parts, walls 22c' and 22c" are cut-away. The wall section at passage 68g and 68g' are also intentionally omitted to fully expose this mechanism. FIG. 13D shows a further enhanced and enlarged elevation of this assemblage. FIGS. 13D' and 13D" provide additional views to fully demonstrate this design.

This assemblage can be aligned and adjusted to provide the intended end-result in a variety of ways; in this particular layout, lever 102 travels along the arc provided by hinge 100 until the underside of catch 104 lands on the bottom ledge inside passage 68g" of gate 108. At this point, lever 102 also pivots at posts 70g' to allow catch 104 to ride the bottom ledge of passage 68g" (inside gate 108) and drop into its locked position. When trigger 98 is engaged, gate 108 is shifted downward to free catch 104 and allow wall 22a' to swing open.

To insure proper functioning of this device, the inside edge of catch 104 is designed to extend slightly beyond gate 108 in order to be fully seated in its locked position. The inside bottom ledge of gate 108 may also be beveled to augment this function. Minor adjustments of recoils 72g' and 72g" may also be made to fine-tune this design.

A simplified lock and release mechanism may also be employed to provide similar results to the former design. FIG. 13E shows an application of a more economical lock and release mechanism to provide an additional alternative retaining structure. This system again employs a pivotally hinged front wall 22a". In this system however, wall 22a" is produced with an inward extending jog or wall integrally. A back wall 22b" is also provided with a built-in extending wall to provide a guide for the cassette player as shown (FIG. 13E).

A locking strap 116 is bonded with a conventional adhesive to the top ledge of 22a" as shown. Strap 116 employs a conventional hook and loop fastening system such as VELCRO™ to lock wall 22a" in its closed operative position. The hook portion of this fastening system is applied to the underside of strap 116 which extends over wall 22b". The loop portion is applied to the top ledge of the forward extending jog of wall 22b". Strap 116 is made of a strong flexible material such as canvas or leather to provide a lasting vehicle for this lock and release system. Strap 116 is designed with a grip tab 118 to provide a convenient handle or grip to maneuver wall 22a" forward and back. Wall 22a" may also be produced to match-fit the front profile of a given cassette player to provide a more cohesive design. Protective lining 24 is applied as a standard feature in these alternative retaining structures.

These modified retaining structures allow cassettes to be removed and replaced from front-loaded cassette players without fully removing the cassette player. These assemblages also provide an additional means of access to adjust the controls of the cassette player without repositioning the foot-pedals.

Additional modifications to the original retaining structure are also available. For example, the design and application of modified walls shown in FIG. 13E offer the possibility of a retaining structure with two stationary walls. Again one or both of these stationary walls can incorporate an extending jog in order to easily direct the cassette player into its operative position. This design option,which is shown later in this text, offers the advantage of providing access to three sides of the cassette player.

Figure 14:
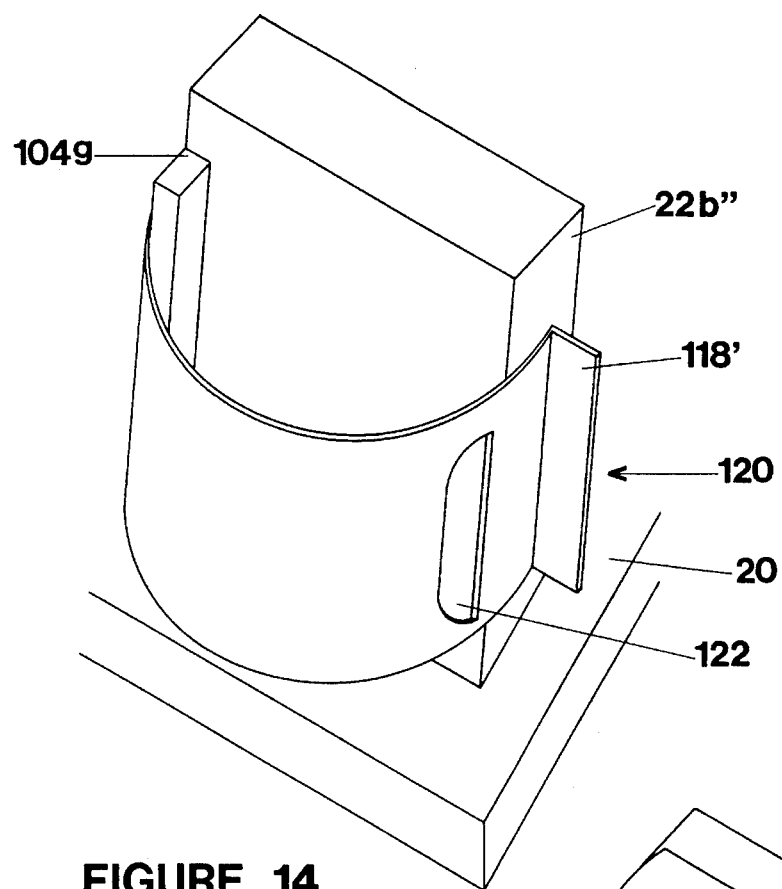
Figure 14:
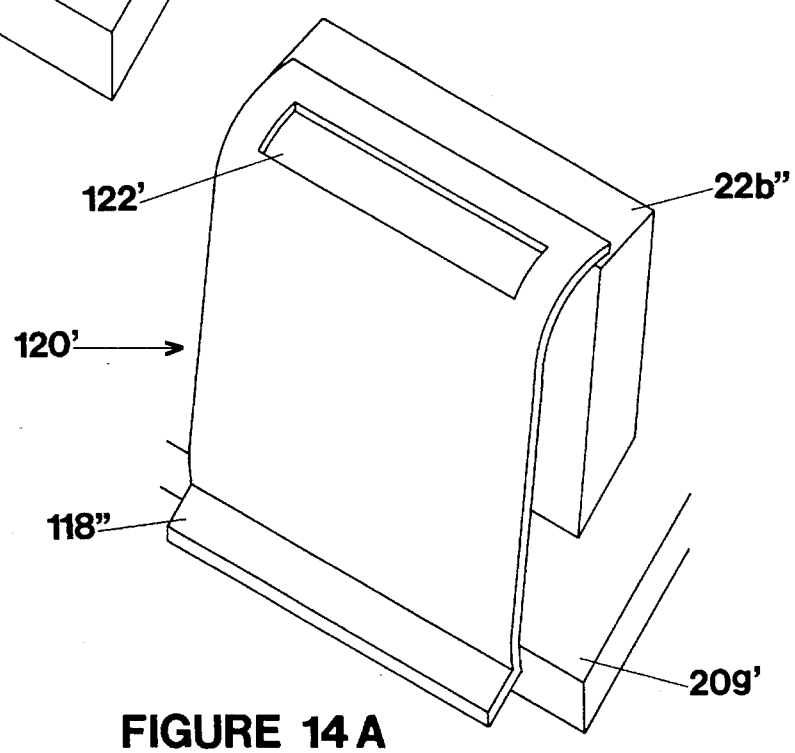

Alternative Flexible Retaining Structures (FIGS. 14 and 14A)

As FIGS. 14 and 14A illustrate, it is feasible to provide a retaining system with one main back wall and a secondary retainer. FIG. 14 shows one possible interpretation of a retaining structure with a soft-shell flexible retainer 120. This system employs a flexible woven mesh, fabric, or soft leather casement to provide a secondary opposing surface to maintain the cassette player stationary. This retaining structure also incorporates a stationary wall 22b" with a forward extending catch 104g on one side. Catch 104g here again provides a built-in guide to quickly position the cassette player. In this particular design, catch 104g also provides a mounting ledge for retainer 120 as shown. Catch 104g is not an essential feature but is preferred for its added convenience. Retainer 120 is simply a flexible material applied to conform to the front profile of the cassette player. Retainer 120 is adhered and bonded to catch 104g at its outside edge as shown. A conventional hook and loop fastener is employed at the opposite end of wall 22b" to fasten retainer 120. Retainer 120 also incorporates a grip tab 118' to maneuver retainer 120. Retainer 120 provides an appropriate cut-out 122 to expose the input jacks of the cassette player (FIG. 14).

Another variation of this device is shown in FIG. 14A. This soft-shell retainer 120' is permanently mounted to wall 22b" and is fastened to the base 20g' again with a conventional hook and loop fastener. A grip tab 118' is provided to open and close this soft shell retainer. This design may be employed to expose both ends of the respective cassette player. These soft-shell retainers may again be fabricated to match-fit a given cassette player.

The dimensions of a given cassette player will of course vary from one unit to another; to apply this design solution with the IBANEZ™ models, the reader may contact the manufacturer/ distributor identified earlier in this text. These units are also readily available by mail-order through Workshop Records of Austin, TX, 1-800-543-6125.

The application of a soft-shell retainer as demonstrated in FIGS. 14 and 14A provides another secondary means to access the cassette player without repositioning the foot-pedals. This design is however generally less desirable as it defeats the secondary advantage of the preceeding designs; a full three-sided carriage is most preferred, when applicable, for its inherent structural integrity and intrinsic shielding function.

Alternative Foot-Pedal Support Structure and Mounting System: Assembly-H, (FIGS. 15 through 15D)

The various retaining systems demonstrated in this text provide the opportunity for additional foot-pedal and support structure designs. This particular system applies several designs and design principles previously disclosed in this text. The foot-pedals applied in this system are again borrowed from Assembly-B, FIGS. 8 to 8E.

Figure 15:
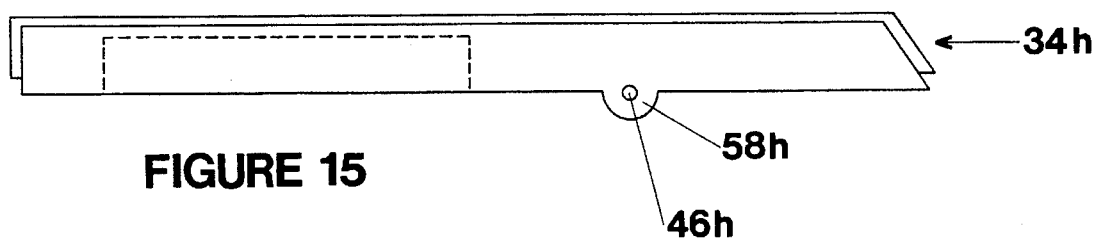
FIGS. 15 through 15D show various applications of an alternative foot-pedal support structure and mounting system.
Figure 15:
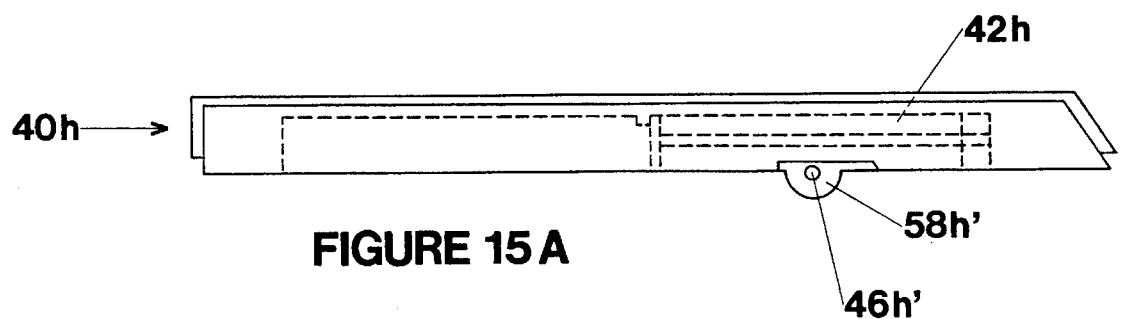
Figure 15:
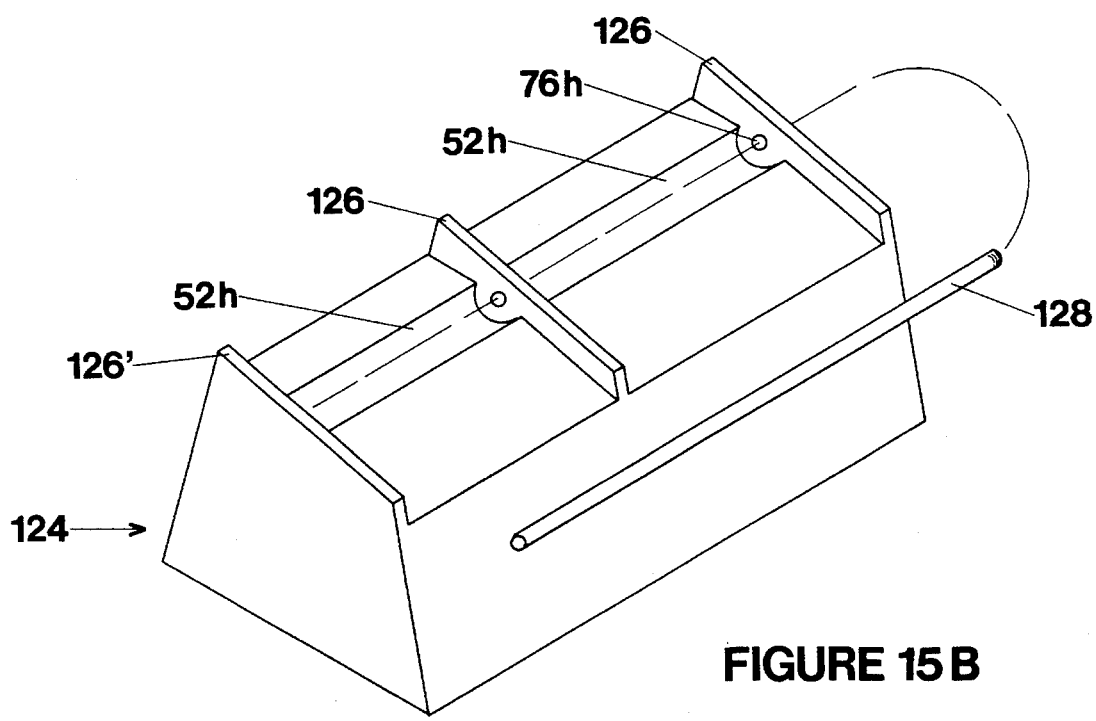

FIG. 15 shows a pivoting foot-pedal 34h with a built-in stationary mounting block 58h. Mounting block 58h is designed with a one-half round radial under-surface as shown. A mobile-pedal 40h is here again provided with an adapter cartridge system 42h which is also provided with a semi-circular mounting block 58h' as shown (FIG. 15A). Mounting blocks 58h and 58h' are designed with a through-hole or chamber 46h and 46h' located at the center point or pivot-axis of each radial block.

Figure 15C:
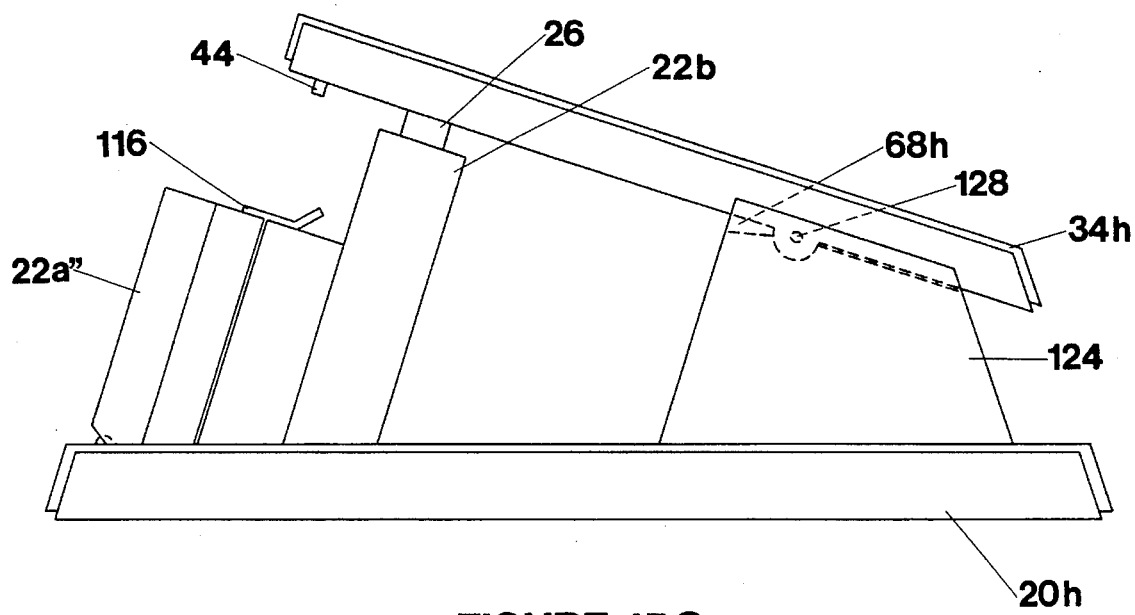
Figure 15D:
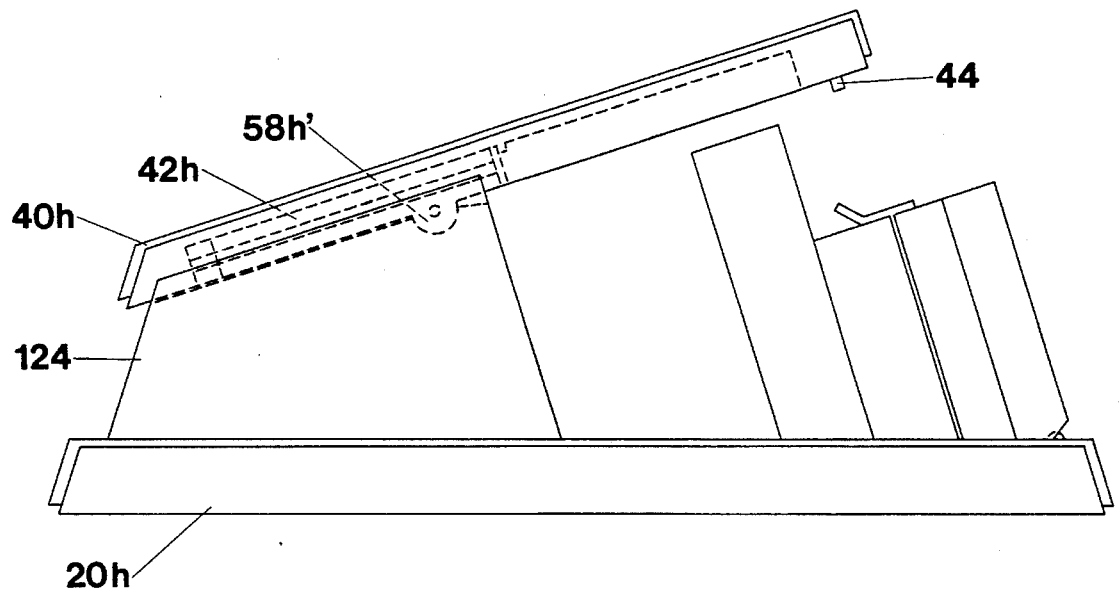

A single wedge-shaped support structure or trestle 124 is employed in this design to support the respective foot-pedals (FIG. 15B). The top plane of trestle 124 is designed with two radial concave tracks 52h to provide matching seats for mounting blocks 58h and 58h'. Tracks 52h are located toward the front of trestle 124 as shown. This placement increases the top surface of trestle 124 behind the pivot-axis to provide optimal support for the respective foot-pedals. The top surface of trestle 124 runs parallel with the resting plane of the foot-pedals behind tracks 52h, as shown in FIG. 15C. The respective foot-pedals actually rest on trestle 124 behind the pivot-axis as illustrated. The top plane of trestle 124, in front of tracks 52h, is beveled or tapered downward to provide a radial passage 68h, (FIG. 15C). This beveled front section intersects with tracks 52h below the central pivot-axis to provide clearance for the respective foot-pedals to be pivoted during operations.

Trestle 124 is designed with rigid retaining walls 126 and 126' which extend upward, beyond the top plane of trestle 124 as shown in FIG. 15B. Retaining walls 126 and 126' are provided integrally and function as lateral guides for the foot-pedals. Retaining walls 126 are provided with round holes or cavities 76h as shown. Cavities 76h align with the central axis of mounting blocks 58h and 58h' when assembled. Retaining wall 126' is tapped and provides a threaded female socket in-line with cavity 76h. A retaining rod 128 is inserted through cavities 76h and mounting blocks 58h and 58h' to interlock the respective foot-pedals to trestle 124. Retaining rod 128 is threaded into retaining wall 126' when assembled. Trestle 124 is again mounted to the back section of a base 20h as shown in FIG. 15C.

The designs shown in Assembly-H eliminate the need for a separate pivot-shaft. Foot-pedal 34h employs block 58h to pivot in-place on the respective support structure. Mobile-pedal 40h can again be shifted forward and back and from side to side on the adapter component, cartridge 42h, in order to pivot in-place from multiple locations on block 58h'.

As FIG. 15D illustrates, one embodiment of this assembly can be manufactured and operated without the biasing mechanism. To accommodate this assembly, mounting block 58h' is positioned more toward the front of cartridge 42h as shown, (FIG. 15D). This modification shifts the pivot-axis of the respective foot-pedal forward, toward the center, to further increase the heel-space behind the pivot. To operate this embodiment, the operator can retract or reset the respective foot-pedal and disengage the foot-pedal button manually, by simply shifting the heel of the foot-pedal back down, in contact with trestle 124. Mobile-pedal 40h can again be shifted into multiple locations in its operational plane of rest by gliding the heel portion of the foot-pedal on trestle 124.

This manually retracted version of an Assembly-H design is advantageous in that it reduces production costs and eliminates parts which are subject to wear, however, the preferred embodiment employs the automatic resistance mechanism for its added convenience. Retaining rod 128, which is also not essential to this design, is omitted from FIG. 15D for the purpose of demonstration. The application of retaining rod 128 is again preferred in this assembly to interlock the respective foot-pedals to the support. These embodiments employ front-loaded retaining structures with hinged fore walls to provide easy access to the cassette player, FIGS. 15C and 15D.

Interconnected moving elements such as mounting blocks, tracks, and chambers may employ metal sheathing to reduce wear, as shown earlier in this text. Lubricant may also be applied to this sheathing to enable the parts to move freely. Additional guidelines to apply these designs are offered in the Foot-pedal Size and Placement section to follow.

The design applications demonstrated in Assembly-A through Assembly-H show a successive evolution of design development which build upon the former designs. These alternative solutions incorporate the fundamental criteria and objectives of the original embodiment. The specific dimensions provided in the Alternative Designs portion of this text are offered as a foundation of reference to apply these designs; to insure proper functioning of these modified components, minor adjustments or fine tuning may be necessary. For additional assistance in producing or procuring working drawings to apply these designs, the reader may correspond with the inventor through P. O. Box 791, Greenbelt, Md. 20768.

Additional Design Considerations

The contributing principles responsible for the success of the original concept, design, and prototype can be identified and further evolved.

Figure 16B:
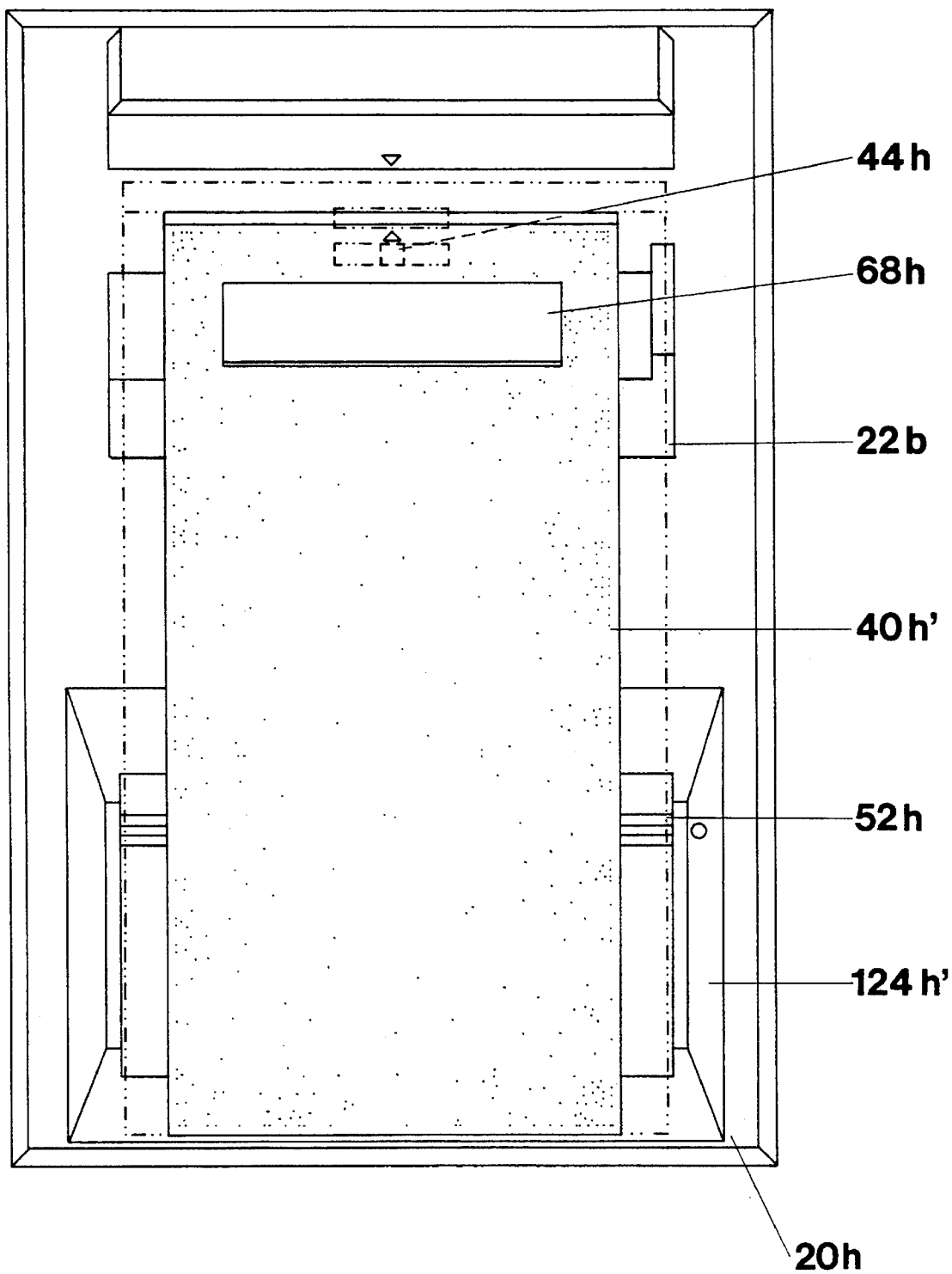

Mono Mobile Foot-Pedal Systems, (FIG. 16, 16A, and 16B)

The essential principles demonstrated in the mobile foot-pedal systems shown in this document can be employed to provide one mobile-pedal to perform the functions of both foot-pedals. To provide access to three or more juxtaposed control buttons of the cassette player with a single mobile-pedal, the range of lateral mobility of the mobile-pedal can be increased as necessary. FIG. 16 shows this universal mobile-pedal modification applied to the former design in Assembly-H. These principles can be applied to any given system in this text.

FIG. 16 shows a modified mobile-pedal 40h' based on mobile-pedal 40h; Mobile-pedal 40h' is pivotally hinged to the support structure with the adapter cartridge assembly illustrated in the former design, Assembly-H. Mobile-pedal 40h' is increased in width and is provided with a modified button 44h' to engage the control buttons of the cassette player. Button 44h' is narrowed to 5 mm. in width to facilitate access to the control buttons of the cassette player. Button 44h' is located on-center, toward the distal end of mobile-pedal 40h' as shown. Mobile-pedal 40h' is further modified with a narrow slot or cut-out 122h in the underside of the pedal, in line with button 44h'. Cut-out 122h is designed to be more narrow in width than the resistance mechanism 26 in order to catch the apex of the radial top of resistance mechanism 26 when mobile-pedal 40h' is centered on the support. This relationship is best shown in section in FIG. 16A. This feature provides a physical reference to align button 44h' with the center button of the cassette player without significant effect on the resting plane or elevation of button 44h'. Cut-out 122h is not an essential feature in a single pedal embodiment, it is provided to facilitate access to the center control button.

A trestle 124h' is also modified to accommodate this embodiment as shown; Trestle 124h' employs a single track 52h' to provide lateral mobility. Retaining walls 126h and 126h' restrict and guide mobile-pedal 40h' into its peripheral operative positions.

In this application, mobile-pedal 40h' can simply be shifted from a central position, to fully left and fully right positions to align button 44h' with the control buttons of the cassette player.

This lateral mobility is again possible on two planes (forward and back positions) as demonstrated in plan view, FIG. 16.

FIG. 16B shows a variety of this single mobile-pedal embodiment without the respective resistance mechanism. Note that the pivot-axis is again brought forward to provide the operator with greater leverage and support behind the pivot point to maneuver the foot-pedal. A center marker or indicator is also provided on the mobile-pedal and the fore wall of the retaining structure to provide the operator with a visual reference to easily access the center button (as shown). This further modified mobile-pedal also provides a window or passage 68h to allow the operator to view and access the controls of the cassette player. This particular embodiment employs a retaining structure with two stationary walls as discussed earlier.

The embodiments shown in FIGS. 16 and 16B demonstrate the multiple positioning of a single mobile-pedal for operating the IBANEZ™ models and can be specified to accommodate other variations of this specialized tool as described in the ramifications segment to follow. Dual Mobile Foot-Pedal Systems, (FIGS. 17 and 17A)

The principals shown in this text can be applied with two mobile foot-pedals in order to produce a greater variety of ramifications and embodiments. In this dual mobile foot-pedal system, many varieties and combinations of mobile-pedals are possible. For example, one embodiment can employ a first mobile-pedal which only shifts laterally and a second mobile-pedal which only shifts forward and back. FIG. 17 shows this ramifications applied with the most basic elements shown in the original embodiment. The button configuration of the IBANEZ™ model is also used for the purpose of demonstration.

In this system, mobile-pedal 40L is free to shift from side to side within extended lateral boundaries to access the rewind/review and fast forward functions. Mobile-pedal 40R is employed to shift forward and back within restricted lateral boundaries to access the play and stop functions of the respective cassette player as shown. This alternate mobile-pedal application offers a viable option to the original design however, this variety is less desirable as it complicates operations.

FIG. 17A shows another application of two mobile foot-pedals to further enhance the effectiveness and flexibility of the original concept. This universal modification is again applied with the most basic elements for the purpose of demonstration. This ramification offers greater flexibility to the manufacturer as well as the operator of these specialized learning tools by providing hands-free access to eight or more functions of a given cassette player. This combination can provide remote access to a multitude of additional functions to enhance this approach to learning. In this dual mobile-pedal system, one pedal can provide access to the basic or standard functions; play, fast forward, rewind/review, and stop. A second mobile-pedal can be employed to trigger secondary features to further enhance this instructional process. One feature may provide an on/off button to control the ½ speed function of the cassette player. Another feature, which would be of great use to operator, could provide sound enhancement to push or raise certain frequencies or instruments. An additional feature may trigger a Karaoake simulator to pull a certain track out of the mix in order to rehearse passages without full accompaniment. These additional features can be accessed remotely in addition to the standard functions of a given specialized cassette player to provide a state of the art learning system. The implementation of this design with a higher-end cassette player or digital audio tape (DAT) player can provide an optimal instructional tool for musicians.

Foot-Pedal Size and Placement

The combined results of the elements of my foot-controlled operational mechanism produce a synergistic effect with unintentional advantages; the secondary function of this learning tool as a musicians foot-stand is serendipitous and significant. Though the size, shape, and placement of the foot-pedals may vary to some degree, several guidelines are recommended. These guidelines are again generated from trials with the original working model. Specifically, the length of the foot-pedals are sized over two-thirds of the length of the base. The width of the foot-pedals, at their widest point, are sized over one-third of the width of the base. In addition, the resting incline or slope of the foot pedals is generally recommended between 10 and 30 degrees with respect to the base; the various embodiments presented in this document show the foot pedals mounted in the median range between 15 and 22 degrees. These ratios and minimal standards are parameters which are intended to provide sufficient and practical support for the foot of the operator. Furthermore, the pivot-axis for the respective foot-pedal(s) is recommended to be inset at least 50 mms from the back edge of the foot-pedal in embodiments with biasing mechanisms. At least 100 mms of heel-space is recommended behind the pivot-axis in embodiments without biasing mechanisms. This placement is desirable to position the majority of weight imposed by the operator in relative proximity to the primary support. This orientation is also preferred to provide sufficient heel-space behind the pivot-axis for ease of operations. Finally, the distance between the pivot-axis and the respective foot-pedal button is recommended to be at least 130 mms. These guidelines are established to produce an ergonomically-sound operational mechanism which also provides a practical musicians footstand as an additional function.

Production Model

Production Model, Half-Speed Switch Selector
(FIGS. 18 and 18A)

A secondary operational mechanism is also available to provide an additional function for the various embodiments of my foot-controller. FIGS. 18 and 18A show a dual pivoting, foot-controlled, switch-selector generally indicated at 130, developed specifically to address the layout and operations of the IBANEZ™ models. Switch-selector 130 provides remote access to the ½ speed function of this cassette player and can also be adapted to provide hands-free access to equal or relative functions of other specialized cassette players.

A mounting plate 88j is designed to provide a base mounting structure for selector 130. Mounting plate 88j is securely fastened to the top ledge of wall 22b of the retaining structure with two counter-sunk flat-head screws as shown. The front edge of mounting plate 88j is tapered outward at its base as shown in perspective. Two radial female mounting blocks 58j and 58j'' extend back from plate 88j as shown in FIG. 18.

A top mounting plate 88j' is pivotally hinged to plate 88j with a central male mounting block 58j'. A pivot-rod 132 travels through these mounting blocks at the central pivot axis and is threaded into block 58j'' (FIG. 18A). The threaded end-portion of pivot-rod 132 is decreased in diameter in order to provide a minimal tolerance between the main shaft of rod 132 and the respective mounting blocks. Mounting blocks 58j, 58J', and 58j'' are also fitted cleanly together with minimal tolerance to provide just enough play for plate 88j' to be rotated up, away from plate 88j. Mounting plate 88j' descends downward at its front-half and rests on wall 22b during operations. The downward jog of plate 88j' is also tapered at its inside edge (parallel with the front edge of mounting plate 88j) to facilitate this design. Plates 88j and 88j' are mounted flush with the front and right edges of the top of wall 22b to avoid unnecessary contact with the cassette player.

A switch selector 130a is pivotally mounted to plate 88j' with a round-head shoulder bolt 134 as shown. Bolt 134 is threaded into plate 88j' leaving a minimal tolerance between the underside of bolt 134 and plate 88j'. Selector 130a is provided with an extended foot-pad 136 as shown. Foot-pad 136 is designed to run parallel with base 20 of the respective foot-controller. A 5 mm drop for a length of 25 mm is the pitch-ratio taken from the top of wall 22b on the original model. Foot-pad 136 is provided with a slip-resistant surface 36 for added friction. Selector 130a extends forward, over the respective cassette player, in its operative positioning. Selector 130a has two rods or prongs 138 which descend below the front extension of selector 130a to contact the z½-speed switch (FIG. 2, Function L) of the cassette player. Prongs 138 are encased with heat-shrinkable rubber tubing to prevent damage to the ½ speed switch, which is made of plastic.

Start and finish mechanical stops are also provided to restrict the pivotal range of motion of selector 130a in order to avoid damage to the cassette player. Stop 52j is provided integrally with selector 130a, as shown in FIGS. 18 and 18A. Stop 52j is simply an intermittant block which extends inward on the inside of selector 130a, between selector 130a and the mounting plates below, to provide a consistent starting position for this switch-selector. Stop 52j is equivalent in width to the space between selector 130a and the respective mounting plates (FIG. 18A). Stop 52j' is a male-threaded, adjustable stop, and is screwed into the side plate of 88j' as shown. Stop 52j' is adjusted and set during assembly to stop this pivoting mechanism at the point where the ½-speed switch is shifted fully on (left). Selector 130a can be lifted (pivoted up) on plate 88j' to insert the cassette player into place. With the cassette player in place, selector 130a can be brought down into its operative position. Once in position, foot-pad 136 can be shifted forward and back by foot to engage and disengage the ½ speed function of the cassette player as necessary. FIG. 18A shows the ½-speed switch in its off position, between the rubber encased prongs 138. FIG. 18A also shows selector 130a in its full range of motion from start to finish. To retrofit selector 130 to the foot-controller, which was specifically designed for a particular cassette player, several additional guidelines are offered: To avoid contact with the foot-pedal, the overall height of selector 130 cannot exceed the distance between the top of wall 22b and the underside of the respective foot-pedal when depressed. The overall height of selector 130, excluding bolt 134, is 9 mms based on the original model. The height of button 44 and the respective resistance mechanism may also be increased, if necessary, to provide additional clearance. Furthermore, bolt 134 is located in plate 88j', on-center with the center point between the two positions of the ½ speed switch. This relative orientation provides the most effective lateral arc for prongs 138 to manipulate the respective switch. The specific placement and depth of prongs 138 are ideally determined with selector 130 assembled and mounted. Finally, the recoil-loaded resistance mechanism is to be mounted at least 5 mms left of its original placement to accommodate this retro-fitted part.

This description along with FIGS. 18 and 18A present an original switch-selector 130 adapted to the first basic embodiment. A commercial model of selector 130 can be simplified for cost-effective production and assembly. For example, plate 88j can be provided integrally with wall 22b. Start and finish mechanical stop functions can be provided integrally with one continuous tapered or wedged stop 52j. Also, prongs 138 can be eliminated and replaced with a hollow recess, in the underside of selector 130a, to manipulate the ½ speed switch of the cassette player.

Production Model, Optional Element (FIG. 19)

Although the original working prototype and preferred commercial embodiments include a central reinforcement element such as support 38, this element is not essential; one embodiment of the production model may incorporate a modified pivot-shaft with a built-in lateral guide. FIG. 19 shows a modified pivot-shaft increased in diameter and made of reinforced, hardened, or case-hardened steel to provide greater resistance to stress. This modification is introduced as a possible cost-savings option; the preferred commercial embodiment is again manufactured with a center support.

Description of Production Models: Construction Methods and Materials (FIGS. 20–22A)

FIGS. 20 through 22A illustrate several potential commercial concepts of my foot-controlled operational mechanism. Engineered with a variety of designs presented in this text, these production models incorporate several appropriate commercial considerations. These additional considerations are intended to produce a viable commercial product and address the need for cost-effective production, enhanced aesthetic appeal, and increased marketability.

The first consideration in providing a commercial embodiment of my foot controller relates to construction material. The various embodiments shown in FIGS. 20 through 22A are designed to be manufactured mainly of strong, rigid, molded plastic; certain elements including pivot-shafts, bushings, recoil-mechanisms, and sheathing (where applicable) are preferably constructed of metal as specified. This preferred means of construction provides a more flexible medium with several inherent and practical advantages: First, molded-plastic fabrication offers an economical means to produce a quality product in volume. This method also provides a vehicle to produce these integrated components and assemblies without the costs of machining. In addition, several elements can be manufactured integrally to further reduce production expenses. For example, mobile and pivoting foot-pedals can be produced with foot-pedal buttons as one part. These foot-pedals can also be produced with slip-resistant surfaces impressed into the plastic during production; this functional consideration also offers an opportunity to emboss a trademark, brand-logo, or other clever design into the top surface of the pedals. Furthermore, the original embodiment was conceived, developed, built and tested with practicality and function as the primary objectives; with just a few design considerations, the aesthetic appeal and overall marketability of my foot-controller can be greatly enhanced. To provide an attractive and visually appealing foot-controller as a viable commercial product, the aesthetic or visual elements can be easily modified; simple variations of line, form, shape, color and texture can provide a wide array of possible visual effects. These visual elements can be applied and arranged with the diverse structural components shown in this text to create a large variety of design interpretations.

Production Model A (FIG. 20)

FIG. 20 shows a preferred embodiment of my compatible foot-controller. This design combines the simplicity of the working prototype with the art of contemporary manufacturing. This model employs molded-plastic fabrication to produce an integrated chassis with a base, support structure, and retaining carriage, as one unit. This integrated chassis employs a press-fit side-access panel 80 where a pivot-shaft can be inserted to facilitate quick, economical production. Existing cavities 76 are provided in shaft-support 28 to house steel bushings 30, as shown. A mounting clip 66 is also provided integrally to guide and fasten a center support. Mechanical stops 64 are produced as a part of base 20 to allow the foot-pedal to be placed in a convenient neutral position. Mounting cavities 76' are also provided integrally to easily mount the respective resistance mechanism. These features will reduce assembly time dramatically to insure cost-effective production. Reinforcement struts or cross-members are also employed in this design to provide a sturdy, rigid structure that is light and portable. The foot-pedal system shown in As- sembly-A, FIGS. 7C to 7F, is preferred for this embodiment for its simplistic, economical design. Machined and molded plastic components demonstrated in this text may be procured through ITEN Industries of Ashtabiula, Ohio. For additional potential suppliers, see Thomas Register, Volume 14.

Production Model B (FIGS. 21, 21A and 21B)

FIG. 21 shows another integrated chassis application made possible with molded-plastic. This design incorporates the foot-pedal system previously shown in Assembly-H, FIGS. 15 to 15D. This chassis incorporates the foot-pedal support structure with an integrated central stabilizing support 38h. This design application provides an optional location in the chassis for a foot-pedal biasing system as shown. Cavities 76" are provided integrally in support 38h in order to install the respective resistance mechanism. The length of this specific model is increased to produce sufficient distance between the foot pedal support structure and the respective resistance mechanisms. The tension in resistance mechanism 26 may also be increased, as discussed in the original description, to ensure that the foot-pedals and respective foot-pedal buttons remain in a neutral plane of rest between operations. FIGS. 21A and 21B show a side elevation and section of this embodiment for further reference. FIG. 21B shows one possible cost-effective means of providing the integrated chassis. This model features a convenient storage compartment, below the foot-pedals, to store cassette tapes, plectrums, and other tools of the trade.

Production Model C (FIGS. 22 and 22A)

To create a unified and harmonious appearance between the compatible foot-controller and the specialized cassette player, one market-ready model can repeat and vary some of the existing characteristic elements of the cassette player. For example, the original foot-controller was created to accommodate the IBANEZ™ Rock and Play series; one interpretation of the original embodiment can adapt the curvilinear lines and repeated horizontal motifs which characterize the IBANEZ™ models to create a unified visual effect. FIGS. 22 and 22A show one possible example of a commercial embodiment where the design is harmonious and complementary.

Summary, Ramifications, and Scope

Accordingly, the reader will see that the compatible foot controller of my invention can be used as an invaluable tool to significantly increase the practicality and convenience of widely accepted existing products. The "user-friendly" nature of my design will provide hands-free operations of at least all four major functions of the specialized cassette player; furthermore, this success will be achieved with only one or two foot-pedals. The combined result of these immediate advantages will further increase the potential effectiveness of this successful learning tool. In addition, the introduction of this highly effective operational device to the consumer will resolve a long-existing need in the craft and will address the rapidly growing trend and increased demand in the market. Furthermore still, the pragmatic designs and applications of my compatible foot controller generate several additional advantages:

- The efficient and economical designs of my compatible foot controller reduce undue costs to the manufacturer and consumer by avoiding the use of extraneous parts and labor;
- The implementation of the production model (as discussed above) further reduces manufacturing costs to provide an affordable accessory; this tool in turn can be made accessible and readily available to aspiring instrumentalists at large;
- The compatible foot controller designed as a separate optional accessory can be purchased at a later date as finances permit and easily detached to save space while traveling;
- The weight distribution on my compatible foot controller is balanced to promote stability during operations;
- The compatible foot controller is lightweight enough to be portable, but with enough substance and surface contact to hold stationary during use;
- The preferred retaining structure or carriage design of my foot controller, which holds the specialized cassette player stationary via friction, eliminates the need for additional parts: retaining clips, fastening devices, etc.;
- This preferred carriage also functions as an effective barrier to prevent accidental damage to the cassette player;
- The use of large foot-pedals, resting at a moderate incline, provides an ergonomic design to reduce strain and promote comfort during operations;
- These design considerations provide a secondary result in that the foot-pedals can also be used as strong and practical instrumentalists "foot-stands"; this secondary function of my compatible foot controller will further reduce the risk of strain and injury to the operator by providing an appropriate resting platform during and between operations.
- The wide variety of potential embodiments presented in this document can be implemented to meet the diverse needs and desires of a larger number of manufacturers and end-users; these embodiments can be produced in a broad spectrum of end-products from simple and economical, to more sophisticated higher-end models.
- Finally, the effectiveness of the specialized cassette player used in combination with my foot controller actually improves the learning experience; the increased convenience and efficient repeat/review process reduce frustration and accelerate the necessary procedures to create a more optimal learning environment and improved overall learning experience.

Although the detailed description and figures above contain many specifics regarding the various embodiments of my compatible foot controller, these should not be viewed as limitations of the scope of the invention.

The essential elements of my compatible foot controller, which were originally conceived and developed to enhance the convenience of a specific cassette player, can be used to operate other specialized cassette players. More specifically, the dimensions and placement of essential parts can be specified to accommodate the specific designs of other makes and models which are produced for the same end-purpose. For example, the retaining structure can be made larger or smaller to accommodate the dimensions of the cassette player. The selection, size, and placement of the foot-pedals and foot-pedal buttons can also be specified to meet the specific configuration of buttons on a given specialized cassette player. In fact, my foot controller can be used to provide remote operations of a variety of otherwise hand-operated portable tape players. For example, the PANASONIC™ Portable Cassette Player model RQL 317 is designed with the same button configuration as the IBANEZ™ series of cassette players. This model also features the rewind/review function which can be engaged while the tape player is in play mode. These general purpose cassette players can be operated remotely for a variety of applications as well. This secondary application can provide a means to review and transcribe recorded matter such as class lectures, learning seminars, and meetings. To apply these general purpose cassette players as learning tools for musicians, the operator may simply use an external speaker and amplifier as monitors.

The wide array of embodiments presented in this text are offered as examples of practical applications; the final enterpretations of the essential components will likely evolve further still as composites of these design solutions. The foundation of research and information within this disclosure will easily provide the genus of these matured designs and with a little luck, realize the promise of the original concept.

Thus the scope of the invention should be determined by the appended claims and their legal equivalents, rather than by the examples given.

I claim:

1. A mechanical device for providing foot-controlled operations of specialized cassette players adapted for learning recorded music having control buttons and a half-speed switch, comprising:

a mounting chassis including, a. a base having front and back sections to provide a stationary mounting surface, b. a retaining structure comprising at least one wall extending from said front section of said base and a secondary retainer coupled to said mounting chassis to maintain the cassette player stationary, c. a support structure extending from said back section of said base to support weight imposed by an operator, and a foot-pedal system including, d. a foot-pedal assembly comprising at least one mobile foot-pedal having distal and proximal regions, said at least one mobile foot-pedal pivotally hinged to said support structure with a multi-directional traverse mechanism in order for the mobile foot-pedal to be shifted forward and back and from side to side with respect to said base and pivot in-place from multiple locations to provide said operator with access to multiple functions of the cassette player, e. an actuator comprising at least one foot-pedal projection coupled with said distal region of said at least one mobile foot-pedal to selectively depress the control buttons of the cassette player during operations, and f. a biasing structure comprising at least one recoil-loaded resistance mechanism coupled with said mounting chassis to resiliently bias said at least one mobile foot-pedal away from said control buttons of the cassette player and position the foot-pedal projection into a non-operative placement, whereby a musician can position the mobile foot-pedal into multiple locations and depress the mobile foot-pedal to selectively engage the foot-pedal projection with the control buttons of the cassette player in order to operate the cassette player while keeping both hands on an instrument.

2. The mechanical device of claim 1 wherein said at least one mobile foot-pedal is sized to be at least one third of the width of said base and at least two thirds of the length of said base and is securely mounted between 10 and 30 degrees with respect to said base to provide a sturdy and practical musicians foot-stand for said operator during and between operations.

3. The mechanical device of claim 1 wherein said secondary retainer comprises a fore wall extending from the front section of said base to maintain the cassette player stationary.

4. The mechanical device of claim 3 wherein said foot-pedal assembly comprises two separate adjacent foot-pedals having distal and proximal regions, each of said two separate adjacent foot-pedals is pivotally coupled to said support structure with a hinge mechanism and comprises a foot-pedal projection descending from the distal region of the foot-pedal to depress the control buttons of the cassette player.

5. The mechanical device of claim 4 wherein said biasing structure includes two recoil-loaded resistance mechanisms with mechanical stop means mounted to said at least one wall of said retaining structure to provide individual resistance for each of said two separate adjacent foot-pedals and provide a limited travel distance for each of the foot-pedals to avoid damage to the cassette player during operations.

6. The mechanical device of claim 5 wherein said foot-pedal assembly further includes an adapter component and lateral stabilizer mechanism substantially recessed inside said at least one mobile foot-pedal to operatively couple said at least one mobile foot-pedal to said support structure and maintain the mobile foot-pedal substantially in longitudinal alignment with respect to said base during operation.

7. The mechanical device of claim 6 wherein said two separate adjacent foot-pedals further include slip-resistant means on the top surface of the foot-pedals to increase friction for ease of operations.

8. The mechanical device of claim 7 wherein said fore wall of said retaining structure is pivotally mounted to said base with a hinge mechanism, said retaining structure further comprises a lock and release mechanism operatively coupled with said at least one wall and said fore wall to provide frontal access to the cassette player.

9. The mechanical device of claim 7 further including a foot-controlled switch selector mounted to said at least one wall of said retaining structure to engage the half-speed switch of the cassette player by foot.

10. The mechanical device of claim 7 wherein said support structure comprises at least one pedal-support extending from said back section of said base, said at least one pedal-support, said at least one wall of said retaining structure, and said base are integrally molded of strong rigid plastic.

11. A mechanical device for providing foot-controlled operations of specialized cassette players used for playback of recorded matter and having control buttons, comprising:

a mounting chassis including, a. a base having front and back sections to provide a stationary mounting surface, b. a retaining structure extending from said front section of said base to maintain the cassette player stationary, c. a support structure extending from said back section of said base to support weight imposed by an operator, and a foot-pedal system including, d. a foot-pedal assembly comprising at least one mobile foot-pedal having distal and proximal regions, said at least one mobile foot-pedal pivotally coupled with said support structure with a multi-directional traverse mechanism in order for the mobile foot-pedal to be shifted forward and back and from side to side with respect to said base and pivot in-place from multiple locations to provide said operator with access to multiple functions of the cassette player, and e. an actuator comprising at least one foot-pedal projection coupled with said distal region of said at least one mobile foot-pedal to selectively depress the control buttons of the cassette player during operations, whereby said operator can position the mobile foot-pedal into multiple locations and depress the mobile foot-pedal to selectively engage the foot-pedal projection with the control buttons of the cassette player in order to operate the cassette player while keeping both hands free.

12. The mechanical device of claim 11 further includes a biasing structure comprising at least one recoil-loaded resistance mechanism coupled with said mounting chassis to resiliently bias said at least one mobile foot-pedal away from said control buttons of the cassette player and position the foot-pedal projection into a non-operative placement.

13. The mechanical device of claim 11 wherein said foot-pedal assembly further includes a lateral stabilizer mechanism substantially recessed inside said at least one mobile foot-pedal to maintain the mobile foot-pedal substantially in longitudinal alignment with respect to said base during operations.

14. The mechanical device of claim 11 wherein said retaining structure comprises at least one stationary wall and a fore wall extending from said front section of said base, said fore wall pivotally coupled with the front section of said base with a hinge mechanism, said retaining structure further comprises a lock and release mechanism operatively coupled with said at least one stationary wall and said fore wall to provide frontal access to the cassette player.

15. The mechanical device of claim 12 wherein said foot-pedal assembly comprises two separate adjacent foot-pedals having distal and proximal regions, each of said two separate adjacent foot-pedals is pivotally coupled to said support structure with a hinge mechanism and comprises a foot-pedal projection descending from the distal region of the foot-pedal to depress the control buttons of the cassette player.

16. The mechanical device of claim 15 wherein said biasing structure includes two recoil-loaded resistance mechanisms with mechanical stop means coupled with said at least one wall of said retaining structure to provide individual resistance for each of said two separate adjacent foot-pedals and provide a limited travel distance for the foot-pedals to reduce the risk of damage to the cassette player during operations.

17. A mechanical device for providing foot-controlled operations of specialized cassette players used for playback of recorded matter and having control buttons, comprising:

a mounting chassis including, a. a base having front and back sections to provide a stationary mounting surface, b. a retaining structure extending from said front section of said base to maintain the cassette player stationary, c. a support structure extending from said back section of said base to support weight imposed by an operator, and a foot-pedal system including, d. a foot-pedal assembly comprising at least one mobile foot-pedal having distal and proximal regions, said at least one mobile foot-pedal pivotally coupled with said support structure with a traverse mechanism in order for the mobile foot-pedal to be shifted into multiple locations with respect to said base and pivot in-place from multiple locations to provide said operator with access to multiple functions of the cassette player, and e. an actuator comprising at least one foot-pedal projection coupled with said distal region of said at least one mobile foot-pedal to selectively depress the control buttons of the cassette player during operations, whereby said operator can position the mobile foot-pedal into multiple locations and depress the mobile foot-pedal to selectively engage the foot-pedal projection with the control buttons of the cassette player in order to operate the cassette player while keeping both hands free.

18. The mechanical device of claim 17 further includes biasing means coupled with said mounting chassis to resiliently bias said at least one mobile foot-pedal away from said control buttons of the tape player and position said actuator into an inoperative location.

19. The mechanical device of claim 18 wherein said retaining structure comprises at least one main wall and a fore wall extending from said front section of said base to maintain the cassette player stationary, said fore wall is pivotally coupled with said base with a hinge mechanism, said retaining structure further comprises a lock and release mechanism coupled with said at least one main wall and said fore wall to provide frontal access to the cassette player.

20. A mechanical device for providing foot-controlled operations of portable tape players having control buttons, comprising:

a. a mounting chassis having front and back sections to provide a stationary mounting surface, b. a retaining structure extending from said front section of said mounting chassis to maintain the tape player stationary, c. a support coupled with said back section of said mounting chassis to support weight imposed by an operator, d. a foot-pedal assembly including at least one mobile foot-pedal having distal and proximal regions, said at least one mobile foot-pedal operatively coupled to said support with a traverse mechanism in order for the mobile foot-pedal to be shifted into multiple locations with respect to said base to provide said operator with access to multiple functions of the tape player, and e. an actuator coupled with the distal region of the mobile foot-pedal to selectively depress the control buttons of the tape player, whereby said operator can shift the mobile foot-pedal into multiple locations and engage said actuator with said control buttons of the tape player to selectively depress the control buttons while keeping both hands free.

* * * * *